(12) United States Patent
Ito et al.

(10) Patent No.: US 6,812,835 B2
(45) Date of Patent: Nov. 2, 2004

(54) INTRUDING OBJECT MONITORING METHOD AND INTRUDING OBJECT MONITORING SYSTEM

(75) Inventors: Wataru Ito, Kodaira (JP); Hirotada Ueda, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 375 days.

(21) Appl. No.: 09/791,725

(22) Filed: Feb. 26, 2001

(65) Prior Publication Data

US 2001/0019357 A1 Sep. 6, 2001

(30) Foreign Application Priority Data

Feb. 28, 2000 (JP) ....................................... 2000-050852
Feb. 28, 2000 (JP) ....................................... 2000-050853
Mar. 1, 2000 (JP) ....................................... 2000-060351

(51) Int. Cl.[7] ............................................. G08B 13/00
(52) U.S. Cl. ....................... 340/541; 340/565; 348/169; 382/103
(58) Field of Search ................................ 340/541, 549, 340/545.3, 565; 348/169, 170; 382/103, 218, 219

(56) References Cited

U.S. PATENT DOCUMENTS 5,164,827 A * 11/1992 Paff ............................ 358/108
5,243,418 A * 9/1993 Kuno et al. .................. 358/108
5,434,617 A * 7/1995 Bianchi ....................... 348/170
6,404,455 B1 * 6/2002 Ito et al. ...................... 348/169

FOREIGN PATENT DOCUMENTS

| DE | 4432480 | 5/1996 |
| DE | 19639728 | 5/1996 |
| EP | 529317 | 3/1993 |
| EP | 714081 | 5/1996 |
| JP | 9275520 | 10/1997 |
| JP | 9331520 | 12/1997 |
| JP | 2000-83243 | 3/2000 |

* cited by examiner

Primary Examiner—Toan N. Pham
(74) Attorney, Agent, or Firm—Antonelli, Terry, Stout & Kraus, LLP

(57) ABSTRACT

An intruding object monitoring method using an intruding object monitoring system having a first intruding object monitoring apparatus for monitoring a monitor area by inputting images of the area and at least one second intruding object monitoring apparatus for performing a following of an intruding object. By this method, first intruding object monitoring apparatus acquires detection information of an object intruding into the monitor area, the second intruding object monitoring apparatus captures the intruding object in accordance with the detection information supplied from the first intruding object monitoring apparatus. After the intruding object is captured, the second intruding object monitoring apparatus performs the following of the captured intruding object independently of the first intruding object monitoring apparatus.

27 Claims, 30 Drawing Sheets

ORDER OF TRANSMISSION

INTRUDING OBJECT MONITORING METHOD AND INTRUDING OBJECT MONITORING SYSTEM

CROSS-REFERENCE TO RELATED APPLICATIONS

This invention relates to U.S. patent application Ser. No. 09/592,996 filed on Jan. 13, 2000, in the names of Wataru Ito and Hirotada Ueda and entitled "Object Tracking Method and Object Tracking Apparatus", the disclosure of which is hereby incorporated by reference.

BACKGROUND OF THE INVENTION

The present invention relates to intruding object monitoring techniques, and more particularly to an intruding object monitoring method and an intruding object monitoring system capable of monitoring a plurality of intruding objects with a plurality of monitoring apparatus.

In a recent intruding object monitoring system, some intruding object monitoring apparatus using an image pickup device such as a camera as an image input means does not rely upon a manual monitoring method by a guard man, but automatically detects an intruding object in a monitor area, controls a pan/tilt head of the camera to always capture the intruding object in the view field of the camera in accordance with the detected position of the intruding object, and changes the camera direction and zoom setting to issue a predetermined notice or alarm, to record the image of the intruding object, and the like.

A monitoring apparatus, particularly an apparatus using two cameras, is disclosed in JP-A-5-334572 and JP-A-6-153051.

SUMMARY OF THE INVENTION

In the description of the specification, "tracking" and "following" are defined as in the following.

"Tracking": A process of monitoring by detecting or measuring the positional change of an object on an image taken in the view field of an image pickup device such as a monitor camera.

"Following": A process of monitoring an object by controlling the pan/tilt head of an image pickup device (that is, controlling of the direction of the camera optical axis).

First, in order to describe problems associated with a conventional intruding object monitoring system, a method of monitoring a tank yard with two types of TV cameras such as shown in FIG. 8 will be described.

Referring to FIG. 8, a first camera 802 is an image input means for sequentially picking up an image in the whole monitor area 804 at predetermined times. A first monitoring means including this first camera 802 detects an intruding object 801 from a plurality of frame images picked up at different times, and supplies the detection information of the intruding object 801 to a second camera 803. The second camera 803 is an image input means for automatically performing following of the intruding object 801 and sequentially taking the images thereof at predetermined times, in accordance with the detection information of the intruding object 801 supplied from the first camera 802.

Referring again to FIG. 8, by using a plurality of frame images taken with the first camera 802 at different times, differences between luminance values of each pixel are calculated and an area having a large difference is detected as the intruding object. When the intruding object 801 is detected, the first camera 802 controls the pan/tilt head of the second camera 803 in accordance with the detected position of the intruding object. In this manner, the intruding object 801 can be captured in the view field 805 of the second camera 803.

FIG. 9 is a diagram illustrating the principle of an intruding object detecting method to be used by the first camera 802. This method called a frame subtraction method has been used widely.

Referring to FIG. 9, a subtractor 909 calculates the difference between luminance values of each pixel in an input image 901 taken at time t0−1 and an input image 902 taken at time t0, and outputs a difference image 904 between the input images 901 and 902. Similarly, a subtractor 910 calculates the difference between luminance values of each pixel in the input image 902 taken at time t0 and an input image 903 taken at time t0+1 and outputs a difference image 905 between the input images 902 and 903.

Next, a binarizing unit 911 generates a binarized image 906 by setting "0" if the luminance value of each pixel in the difference image 904 is smaller than a predetermined threshold value Th, and, for example, "255" (assuming eight bits of the luminance value of each pixel) if the pixel luminance value is equal to or larger than the threshold value Th. Similarly, a binarizing unit 912 generates a binarized image 907 from the difference image 905 by the method described above.

Next, a logical product unit 913 calculates a logical product between the luminance values of each pixel in the binarized images 906 and 907 and outputs a logical product image 908. With the above-described operations, human-like objects 914, 915 and 916 in the input images 901, 902 and 903 are calculated as difference areas 917 and 918 by the subtractors 909 and 910. The binarizing units 911 and 912 derives images 919 and 920 as clusters of luminance values "255". The logical product unit 913 detects an image 921 as a cluster of luminance values "255" of each pixel in both the images 919 and 920. In this manner, the image 921 is detected as an intruding object.

Instead of the frame subtraction method, other methods may also be used if they can detect an intruding object in a monitor area.

As described above, when the first camera 802 detects an intruding object 801, the first camera 802 supplies control signals to the second camera 803 in accordance with the size and position of the intruding object 801 detected with the first camera 801. In response to the control signals, the direction (pan/tilt head direction) of a monitor view field 805 of the second camera 803 can be controlled and the intruding object 801 can be captured with the second camera 803.

As described above, the second camera 803 starts operating when an intruding object is detected from images taken with the first camera 802, and the zoom lens and taking direction (pan/tilt head direction) of the second camera 803 are controlled in accordance with the size and position of the intruding object detected from the images taken with the first camera 802.

A control amount of the zoom ratio of the second camera 803 is set in the following manner. For example, if the vertical image size of the first camera 802 is 240 pixels and the vertical image size of the detected intruding object is 30 pixels, then the zoom lens control amount of the second camera 803 is set to an eightfold (=240/30) of the zoom lens control amount of the first camera 802.

By setting the control amounts of the zoom lenses of the first and second cameras 802 and 803 in the above manner, the intruding object detected with the first camera 802 can be displayed over the whole screen of the second camera 803.

A method of calculating a control amount of the pan/tilt head of the second camera 803 will be described with reference to FIG. 10. FIG. 10 illustrates how a second camera 1003 performs following of an intruding object 1001 detected in a view field 1004 of a first camera 1002. For the purposes of simplicity, in FIG. 10, the first and second cameras 1002 and 1003 are set at the same position, and the center direction (optical axis direction) of the view field of the first camera 1002 is made coincident with a reference view field direction (pan/tilt head control angles: pan 0° and tilt 0°) of the second camera 1003, paying attention only to the x-axis direction.

In FIG. 10, 2 W represents the number of pixels (unit: pix) in the horizontal (x-axis) direction of an input image in the whole view field (monitor area) 1004 of the first camera 1002, Δx represents a displacement (unit: pix) in the horizontal direction of a detected intruding object from the view field center of the first camera 1002, θw represents a half monitor angle (unit:°) of the first camera 1002, and θx represents a pan control angle (unit:°) of the pan/tilt angle head of the second camera 1003. A half monitor angle θw of the first camera 1002 is given by:

$$\theta w = \tan^{-1}\left(\frac{1}{2} \times \frac{h}{f}\right) \qquad \text{Eq. (1)}$$

where h (unit: mm) represents the horizontal length of the image pickup device of the first camera, and f (unit: mm) represents a focal length of the first camera.

Under this monitor conditions, the number 2 W of pixels in the horizontal direction of an input image, the displacement Δx in the horizontal direction of a detected position of an intruding object from the view field center of the first camera 1002, the half monitor angle θw of the first camera 1002, and the pan control angle θx of the pan/tilt angle head of the second camera 1003, have the following relation:

$$\frac{\tan\theta x}{\tan\theta w} = \frac{\Delta x}{W} \qquad \text{Eq. (2)}$$

Namely, the pan control angle θx of the pan/tilt angle of the second camera 1003 is given by:

$$\theta x = \tan^{-1}\left(\tan\theta w \times \frac{\Delta x}{W}\right) \qquad \text{Eq. (3)}$$

For example, if the half monitor angle θw is 30°, the number 2 W of pixels in the horizontal direction of an input image of the first camera 1002 is 320 pixels, and the displacement Δx in the horizontal direction of a detected intruding object from the view field center of the first camera 1002 is 40 pixels, then the pan control angle θx of the second camera 1003 is 8.2°.

As described above, a plurality of frame images taken with the first camera 1002 at different times are compared to calculate differences between luminance values of each pixel. When an area having a large difference is detected as the intruding object 1001, the zoom lens and pan/tilt head of the second camera 1003 are controlled in response to control signals which are supplied from the first camera 1002 in accordance with the size and position of the detected intruding object 1001. Since the intruding object 1001 can be captured always in the view field 1005 of the second camera 1003, the second camera 1003 can automatically perform following of the moving intruding object 1003.

If the conventional two-camera structure is applied to such a monitoring system, the following problem occurs. Since a plurality of second cameras for performing following of a plurality of intruding objects are provided, the process amount of the first camera increases in proportion to the number of intruding objects to a problem, because the first camera is required to control the plurality of second cameras.

Further, if the first camera cannot detect temporarily an intruding object, it is not possible for the second camera to continuously perform following of the object, even if the object is at the position where the second camera can capture it.

Furthermore, an intruding object can be detected only if it is in the monitor area of the first camera. Therefore, if the monitor area of the first camera is set so that an intruding object can be taken in a size capable of being detected reliably, the monitor area is reduced.

For example, if an intruding object having a horizontal width of 1.0 m or wider is required to be detected as a cluster having a width of ten pixels or more of a binarized image and the image size is 320×240 pixels, then the monitor area of the first camera has the horizontal length of only 32 m (=1.0/(10/320)). In this case, the area outside of the monitor area of the first camera becomes a blind area while an intruding object is subjected to following by controlling the zoom lens and pan/tilt head.

If an intruding object enters an area behind a building in the monitor area or the blind area caused by an operation limit of the pan/tilt head, the intruding object cannot be subjected to following continuously.

It is an object of the present invention to provide an intruding object monitoring method and an intruding object monitoring system capable of performing following of a plurality of intruding objects by distributing or decentralizing the load of a monitoring process.

It is another object of the present invention to provide an intruding object monitoring method and an intruding object monitoring system capable of performing following of an intruding object with high reliability.

In order to achieve the above objects, according to one aspect of the present invention, there is provided an intruding object monitoring method using an intruding object monitoring system having a first intruding object monitoring apparatus for monitoring a whole monitor area by sequentially inputting images of the area and at least one second intruding object monitoring apparatus for performing following of an intruding object, wherein the first intruding object monitoring apparatus acquires detection information of an object intruding into the monitor area, the second intruding object monitoring apparatus captures the intruding object in accordance with the detection information supplied from the first intruding object monitoring apparatus. After the intruding object is captured, the second intruding object monitoring apparatus performs following of the captured intruding object independently of the first intruding object monitoring apparatus.

In one embodiment, when tracking of the intruding object by the first intruding object monitoring apparatus becomes impossible, the first intruding object monitoring apparatus continues the tracking by acquiring detection information of the intruding object from the second intruding object monitoring apparatus. Accordingly even if the intruding object is missed, tracking of the intruding object can be continued.

In another embodiment, when the following of the intruding object by the second intruding object monitoring apparatus becomes impossible, the second intruding object monitoring apparatus continues the following by acquiring the detection information of the intruding object from the first intruding object monitoring apparatus. Accordingly even if the intruding object is missed, the following of the intruding object can be continued.

According to another aspect of the present invention, there is provided an intruding object monitoring system comprising: a first intruding object monitoring apparatus for sequentially inputting images of a monitor area and acquiring detection information of an intruding object in the monitor area; at least one second intruding object monitoring apparatus for capturing the intruding object by controlling a pan/tilt head in accordance with the detection information acquired by the first intruding object monitoring apparatus, and performing a following of the captured intruding object, wherein the first intruding object monitoring apparatus includes an intruding object monitoring unit, the second intruding object monitoring apparatus includes an intruding object monitoring unit separately from the intruding object monitoring unit of the first intruding object monitoring apparatus, and the second intruding object monitoring apparatus performs the following of the intruding object detected by the first intruding object monitoring apparatus, independently of the first intruding object monitoring apparatus.

In an embodiment, the system has a plurality second intruding object monitoring apparatuses, the intruding object monitoring unit of the first intruding object monitoring apparatus judges whether a new intruding object exists, and if it is judged that a new intruding object exists, identifies one of the second intruding object monitoring apparatuses now not in following, and the identified second intruding object monitoring apparatus captures the newly detected intruding object and performs the following.

It is preferable that the second intruding object monitoring apparatus nearer to the position of the intruding object is assigned the following of the intruding object or that when a plurality of intruding objects are detected, the second intruding object monitoring apparatus is assigned the following of the intruding object existing in the monitor area having a highest priority order.

According to another aspect of the present invention, there is provided an intruding object monitoring apparatus comprising: a camera having a zoom lens; an image processing unit for detecting an intruding object from image signals supplied from the camera; a pan/tilt head of the camera; a pan/tilt controller; a zoom controller; a communication unit for communication with at least another intruding object monitoring apparatus; a display for displaying an intruding object monitoring result; and a control unit for controlling to switch among a plurality of monitoring modes of the intruding object monitoring apparatus and the other intruding object monitoring apparatus(es).

In an embodiment, if the monitoring mode of the intruding object monitoring apparatus is a normal mode (i.e. detecting mode) for monitoring a predetermined monitor area and if the intruding object monitoring apparatus receives a following take-over request from an adjacent other intruding object monitoring apparatus which is tracing an intruding object, the monitoring mode of the intruding object monitoring apparatus is switched to a following mode to take over and perform the following of the intruding object. Accordingly, even if the intruding object enters the blind area of the camera of one intruding object monitoring apparatus, another intruding object monitoring apparatus can take over the following of the intruding object to continue it.

According to another embodiment, if a view field magnification is requested from an adjacent other intruding object monitoring apparatus, the monitoring mode of the intruding object monitoring apparatus is switched to a wide angle mode and monitors an area which is broader than the monitor area in a normal mode and includes at least a partial area of the monitor area in the normal mode of the adjacent other intruding object monitoring apparatus. Accordingly, when an adjacent other intruding object monitoring apparatus enters the following mode, the intruding object monitoring apparatus can monitor its own monitor area and cover the monitor area of the adjacent other intruding object monitoring apparatus.

The foregoing and other objects, features and advantages of the invention will become apparent from the following more particular description of the embodiments of the invention as illustrated in the accompanying drawings.

DESCRIPTION OF THE EMBODIMENTS

Figure 1:
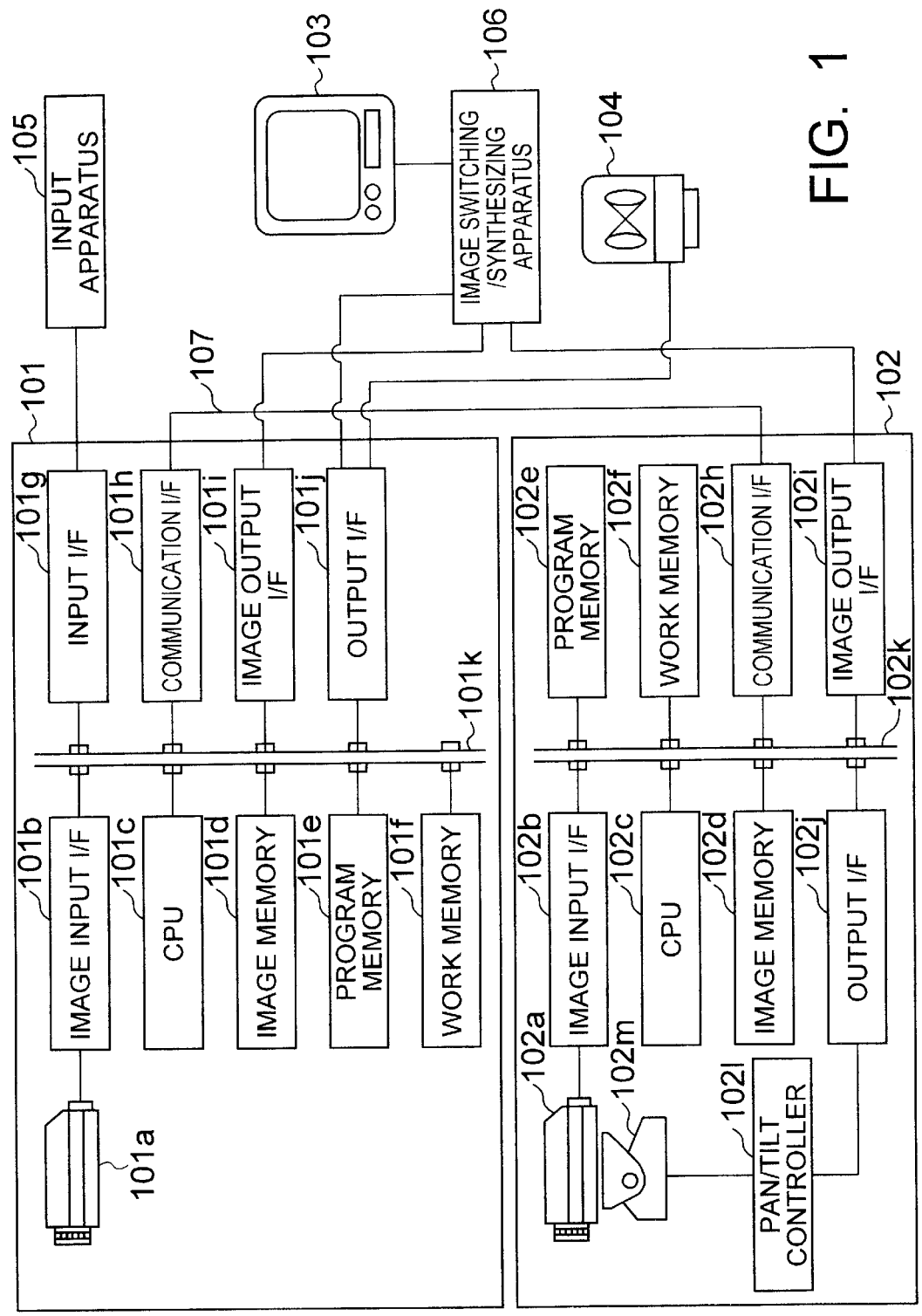
FIG. 1 is a block diagram showing the structure of an intruding object monitoring system according to an embodiment of the invention.

Preferred embodiments of the invention will be described with reference to the accompanying drawings. In the drawings, similar elements are represented by using identical reference characters.

First, an embodiment of an intruding object monitoring system of the invention will be described with reference to FIG. 1.

FIG. 1 is a block diagram showing the hardware structure of the intruding object monitoring system.

First and second intruding object monitoring apparatus 101 and 102 are interconnected by a communication cable 107 via first and second communication I/F 101$h$ and 102$h$.

On the side of the first intruding object monitoring apparatus 101, a first input I/F 101$g$ is connected to an input device 105. A first output I/F 101$j$ is connected to a control signal input terminal of an image switching/synthesizing apparatus 106 and to an alarm lamp 104.

A first image output I/F 101$i$ of the first intruding object monitoring apparatus 101 and a second image output I/F 102$i$ of the second intruding object monitoring apparatus 102 are connected to the image switching/synthesizing apparatus 106 which is connected to a monitor 103.

In the first intruding object monitoring apparatus 101, a first camera 101$a$ is connected to a first image input I/f 101$b$.

The first image input I/F 101$b$, first CPU 101$c$, first image memory 101$d$, first program memory 101$e$, first work memory 101$f$, first input I/F 101$g$, first communication I/F 101$h$, first image output I/F 101$i$, and first output I/F 101$j$ are connected to a first data bus 101$k$.

In the second intruding object monitoring apparatus 102, a second camera 102$a$ is connected to a second image input I/F 102$b$ and mounted on a camera pan/tilt head 102$m$. A second output I/F 102$j$ is connected to a pan/tilt controller 102$l$ which is connected to the camera pan/tilt head 102$m$. The second image input I/F 102$b$, second CPU 102$c$, second image memory 102$d$, second program memory 102$e$, second work memory 102$f$, second communication I/F 102$h$, second image output I/F 102$i$, and second output I/F 102$j$ are connected to a second data bus 102$k$.

Referring to FIG. 1, the first camera 101$a$ takes sequentially at predetermined times images in the whole view field including a monitor area, converts the picked-up images into video signals, and supplies the video signals to the first image input I/F 101$b$. The first image input I/F 101$b$ converts the input video signal into image data having a format matching the intruding object monitoring system (e.g., width of 320 pix, height of 240 pix, and 8 bit/pix), and sends the image data via the first data bus 101$k$ to the first image memory 101$d$.

The first image memory 101$d$ stores the sent image data. The first CPU 101$c$ analyzes the images stored in the first image memory 101$d$, in accordance with a program stored in the first program memory 101$e$ and by using the first work memory 101$f$ as a working area.

The first intruding object monitoring apparatus 101 judges from the analysis result whether an intruding object exists in the view field of the first camera 101$a$. If an intruding object exists, the size, position and the like of the detected intruding object are acquired. In accordance with the process result, the first CPU 101$c$ transmits a presence/absence of an intruding object, position information of the object, tracking result of the object, and other detected information, to the second intruding object monitoring apparatus 102 via the first data bus 101$k$ and first communication I/F 101$h$. If an intruding object is newly detected, an intruding object following assignment and information, such as position information of the object, are transmitted via the first communication I/F 101$h$ to one of the second intruding object monitoring apparatuses 102 which has been assigned with no following and other measures are taken, for example, the alarm lamp 104 is turned on via the first output I/F 101$j$ or a monitor result image is supplied via the image output I/F 101$i$ to the image switching/synthesizing apparatus 106.

The first communication I/F 101$h$ converts transmission data from the first CPU 101$c$ into data of, for example, the RS485 format and transmits the converted data to one or more second intruding object monitoring apparatuses connected by the communication cable 107. Note that in FIG. 1 only one second intruding object monitoring apparatus is shown representing one of the one or more second intruding object monitoring apparatuses 102 and description below is made representatively referring to reference characters of constituent members of the second intruding object monitoring apparatus shown. The first image output I/F 101$i$ converts the signals from the first CPU 101$c$ into data of the format usable by the image switching/synthesizing apparatus 106 (e.g., NTSC video signals), and transmits the converted signals to the image switching/synthesizing apparatus 106.

It is not limited only to one monitor, but two or more monitors may be used as desired by a user. Also, the contents to be displayed can be freely changed as desired by the user.

It is obvious that physical connections between the first and second intruding object monitoring apparatus 101 and 102 and between the input device 105, image switching/synthesizing apparatus 106, alarm lamp 104 and monitor 103 are not limited only to this embodiment, but various methods may be used so long as they can transfer necessary information and signals.

The second camera 102a takes sequentially at predetermined times images in the view field. The camera pan/tilt head 102m changes the image pickup direction of the camera 102a in accordance with a pan/tilt head control signal supplied from the pan/tilt head controller 102l. The second camera 102a converts the picked-up images into video signals, and supplies the converted video signals to the second image input I/F 102b. The second image input I/F 102b converts the input video signal into image data having a format matching the second intruding object monitoring apparatus 102 (e.g., width of 320 pix, height of 240 pix, and 8 bit/pix), and sends the image data via the second data bus 102k to the second image memory 102d. The second image memory 102d stores the sent image data. The second CPU 102c analyzes the images stored in the second image memory 102d, in accordance with a program stored in the second program memory 102e. With this analysis, detection information is obtained such as information that an intruding object exists in the view field of the second camera 102a.

In accordance with the process result, the second CPU 102c sends the control signal to the pan/tilt controller 102j via the second data bus 102k and second output I/F 102j, and transmits detection information such as the position of the intruding object and a following result of the object, to the first intruding object monitoring apparatus 101 via the second communication I/F 102h. The second CPU 102c also sends detection information such as a monitored image to the image switching/synthesizing apparatus 106 via the image output I/F 102i.

The first communication I/F 101h converts transmission data including the detection information from the second CPU 102c into data of, for example, the RS485 format and transmits the converted data to one or more second intruding object monitoring apparatus connected by the communication cable 107. The second image output I/F 102i converts the signals from the second CPU 101c into data of the format usable by the image switching/synthesizing apparatus 106 (e.g., NTSC video signals), and transmits the converted signals to the image switching/synthesizing apparatus 106.

The input device 105 is used for switching a display image in response to a user input from a pointing device, such as a mouse or the like or a keyboard. The monitor 103 displays one of or both the images monitored by the first and second intruding object monitoring apparatus 101 and 102 via the image switching/synthesizing apparatus 106, on the whole screen or in two juxtaposed windows as instructed by the user.

The following flow charts will be described with reference to FIG. 1 showing an example of the hardware structure of the intruding object monitoring system.

Figure 2:
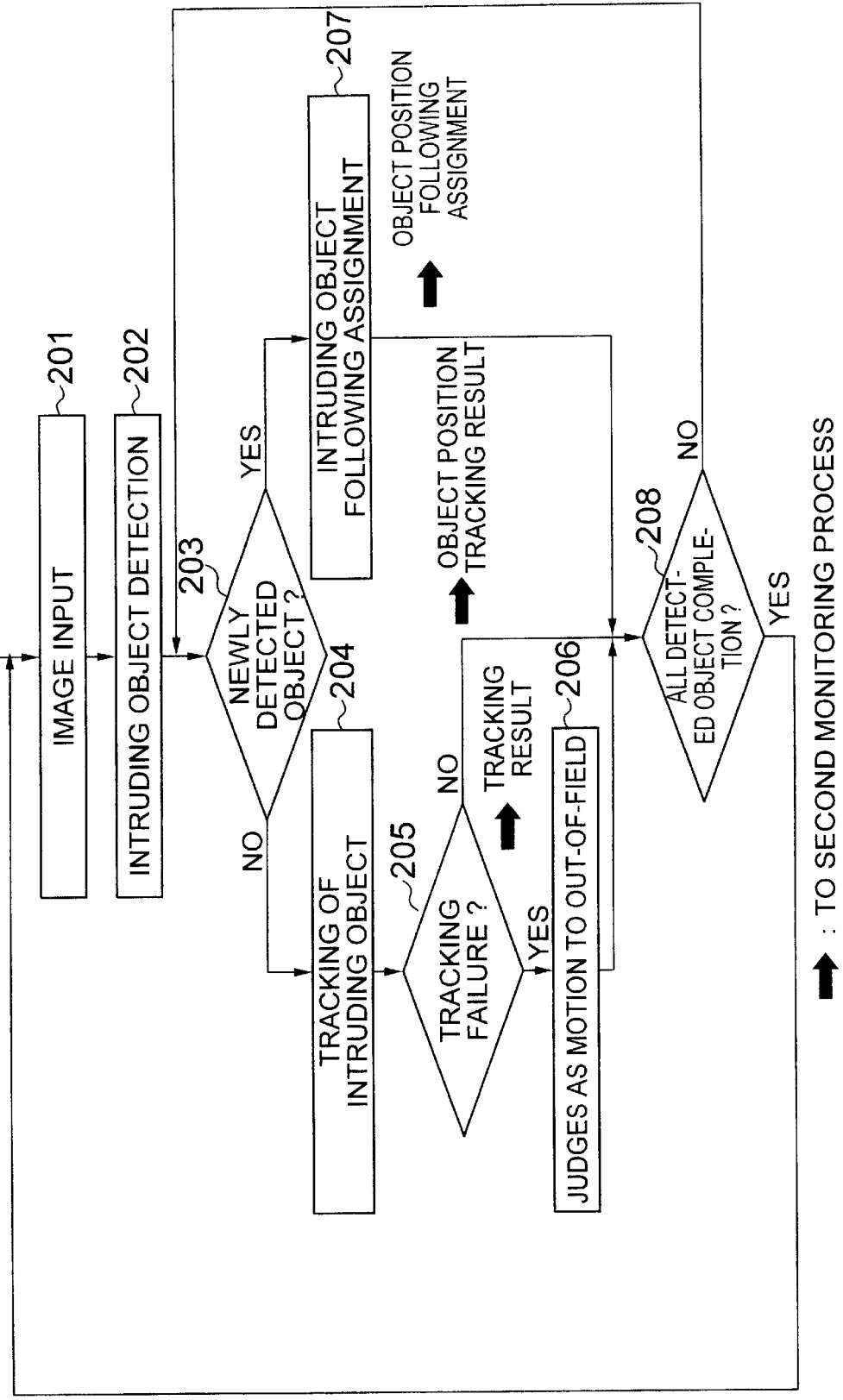
FIG. 2 is a flow chart illustrating an intruding object monitoring method according to another embodiment of the invention.
Figure 3:
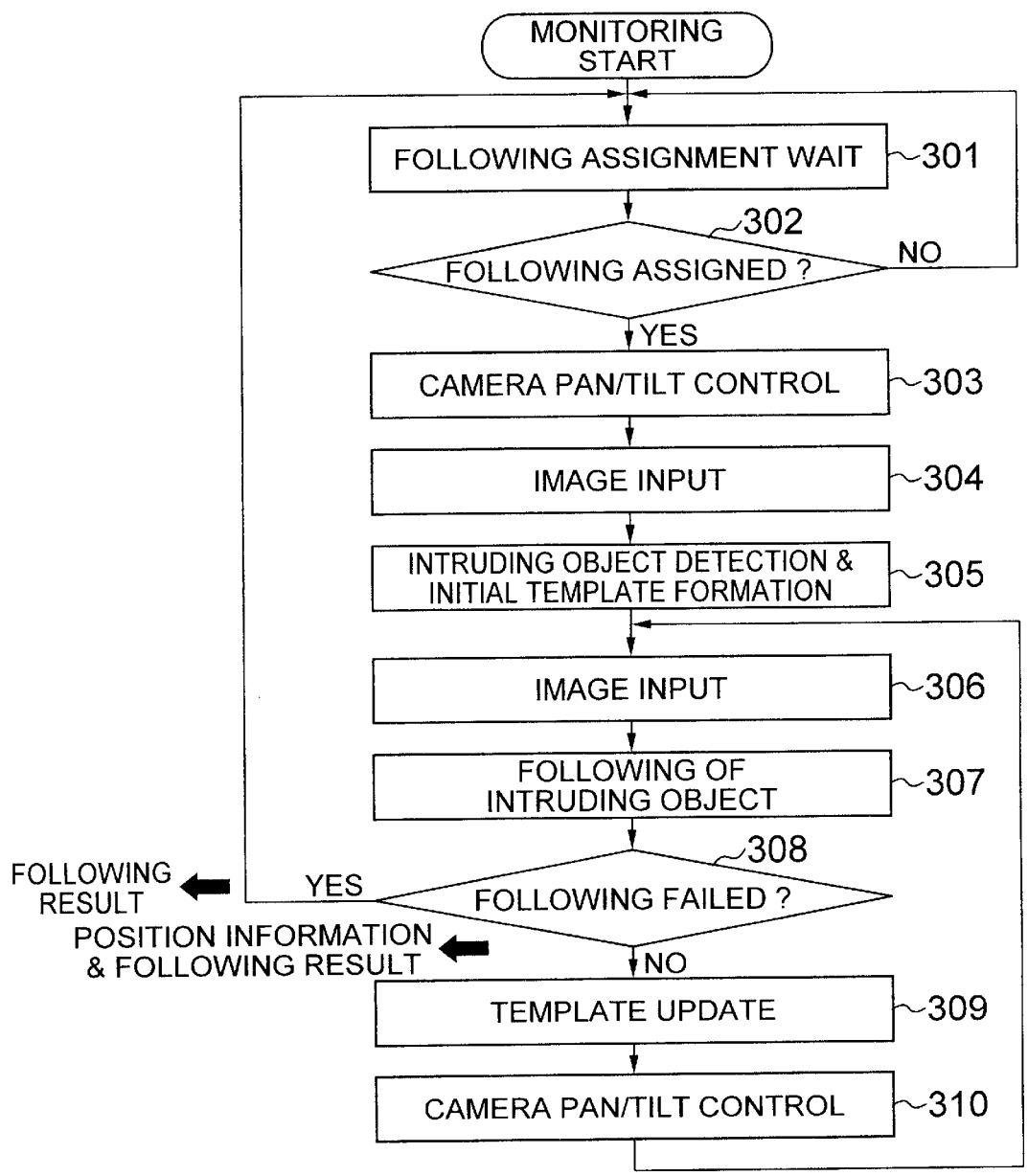
FIG. 3 is a flow chart illustrating the intruding object monitoring method of the embodiment shown in FIG. 2.

FIGS. 2 and 3 are flow charts illustrating the processes of an intruding object monitoring method according to an embodiment of the invention. The flow charts will be described by referring to the intruding object monitoring system shown in FIG. 1.

The method of this embodiment has first and second intruding object monitoring process which are independently controlled such that the first intruding object monitoring process is controlled under the control of the CPU 101c of the first intruding object monitoring apparatus 101 and the second intruding object monitoring process is controlled under the control of the CPU 102c of the second intruding object monitoring apparatus 102 to perform following of an intruding object in the area to be subjected to monitoring processing. Namely, in the first intruding object monitoring process, an intruding object is detected from image signals sequentially input from the first image pickup apparatus (first camera) for taking images in the whole monitor area, and the position change of the detected intruding object is subjected to tracking. In the second intruding object monitoring process, if the first intruding object monitoring process judges that an intruding object exists, the intruding object is detected from image signals sequentially input from the second pickup apparatus (second camera) based on a following assignment request and position information of the intruding object supplied from the first intruding object monitoring apparatus, and the intruding object is subjected to following so as to always capture the intruding image in the view field of the second image pickup apparatus by controlling the pan/tilt head.

FIG. 2 is the flow chart illustrating the first intruding object monitoring process according to an embodiment of the invention. FIG. 3 is the flow chart illustrating the second intruding object monitoring process according to an embodiment of the invention.

Referring to FIG. 2, as intruding object monitoring starts, at an image input step 201, an input image having, for example, a width of 320 pix, a height of 240 pix and 8 bit/pix, is acquired from the first TV camera 101a.

Figure 9:
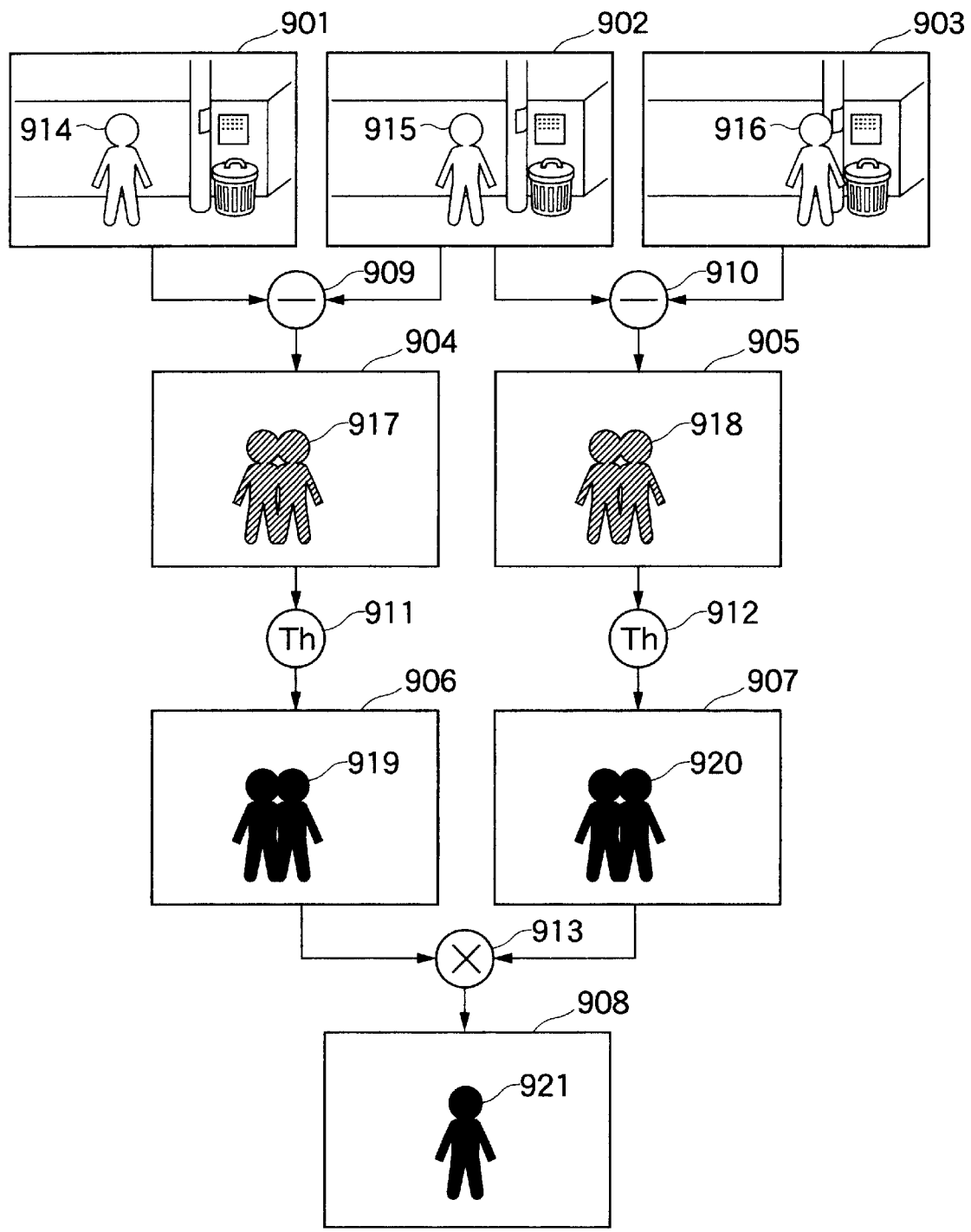
FIG. 9 is a diagram illustrating the principle of an intruding object monitoring method.

At an intruding object detecting step 202, in accordance with the input image, an intruding object detecting process is performed, for example, in the manner described with FIG. 9.

At a newly detected object judging step 203, the position of the present detected object is compared with the position of the past detected object in the frame preceding by one frame to obtain a change amount of the positions. If the change amount is smaller than a predetermined amount (the amount depending upon a view field angle of the first camera 101a, e.g., 50 pixels), it is judged that the detected object existed at a point in time one frame earlier (i.e., the detected object is not a newly detected object), and the flow branches to an intruding object tracking step 204. Here, the time interval at which the input images are acquired at the image input step 201 is, for example, 100 msec. Therefore the "at a point in time one frame earlier" means the point in time 100 msec earlier. If the change amount is equal to or larger than the predetermined amount, it is judged that the detected object is a newly detected object because the object is detected at a location which is remoter than one to which it was expected to move when the object was detected earlier, and the flow branches to an intruding object following assignment step 207.

At the intruding object tracking step 204, the detected object in the frame preceding by one frame is assumed as the present detected object, and the position change of the intruding object is used as a motion locus.

Next, at a tracking failure judging step 205, an angular change between the motion locus of the intruding object before one frame and the present motion locus is calculated. If the angular change amount is equal to or larger than a predetermined value (e.g., 90°), it is assumed as a tracking failure. This assumption depends upon the knowledge that an intruding object does not generally change its motion direction abruptly.

The change amount θ between the motion locus before one frame and the present motion locus is calculated from the following equations assuming that the intruding object before one frame moved from (x11, y11) to (x12, y12) and the intruding object in the present frame moved from (x21, y21) to (x22, y22):

$$\vec{v}1=(x1, y1)=(x12-x11, y12-y11) \quad \text{Eq.(4)}$$

$$\vec{v}2=(x2, y2)=(x22-x21, y22-y21) \quad \text{Eq.(5)}$$

$$\theta = \cos^{-1}\left(\frac{\vec{v1}\cdot\vec{v2}}{|\vec{v1}|\cdot|\vec{v2}|}\right) \quad \text{Eq.(6)}$$

$$= \cos^{-1}\left(\frac{x1x2+y1y2}{\sqrt{x1^2+y1^2}\sqrt{x2^2+y2^2}}\right)$$

If the tracking judging step 205 judges that the tracking was failed, a tracking result of the intruding object is transmitted via the first communication I/F 101*h* to the second intruding object monitoring apparatus 102 to thereafter follow an out-of-view judging step 206. At the out-of-view judging step 206, a signal is sent to the monitor 103 via the image switching/synthesizing apparatus 106 so that the monitor 103 displays a notice of, for example, "intruding object missed" to thereafter advance to an all detected object completion judging step 208.

If the tracking failure judging step 205 judges as a tracking failure, a tracking result indicative of the tracking failure is transmitted to the second intruding object monitoring apparatus 102. The "tracking result of an intruding object" is information including, for example, the position, motion amount, motion direction and the like of the object indicating how the intruding object moved. In the case of an tracking failure, an extraordinary value mentioned below, for example, may be transmitted to the second intruding object monitoring apparatus 102 as the tracking result of an intruding object. For example, it is assumed that the input image obtained by the camera 101*a* or the camera 102*a* has 256 pixels in the horizontal direction and 192 pixels in the vertical direction to identify the coordinate value of an intruding object on the image by a combination of values from 0 to 255 in the horizontal axis (x-axis) and values from 0 to 191 in the vertical axis (y-axis). In this case, a value (999, 999) is an extraordinary value.

If the tracking failure judging step 205 judges as a tracking success, the position as well as the tracking result is transmitted to the second intruding object monitoring apparatus 102 via the first communication I/F 101*h* to thereafter branch to the all detected object completion judging step 208. Right-sided bold arrows shown in FIG. 2 indicate that information resulted from processing is transmitted from the first intruding object monitoring process to one of the second intruding object monitoring apparatuses which executes the second intruding object monitoring process.

At the intruding object following assignment step 207, position information of the intruding object as well as a following assignment signal is transmitted to the second intruding object monitoring apparatus 102 currently not performing following via the first communication I/F 101*h* to thereafter branch to the all detected object completion judging step 208.

Figure 32:
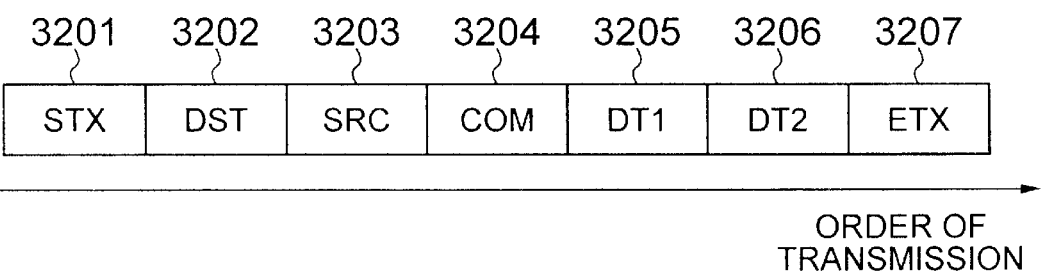
FIG. 32 is a diagram illustrating an exemplary construction of communication information carried on the communication cable.

FIG. 32 shows an exemplary construction of communication information carried through the communication cable 107. Communication data is constituted by data string of 7 byte length and is transmitted in order of STX 3201, DST 3202, SRC 3203, COM 3204, DT1 3205, DT2 3206 and ETX 3207. STX 3201 represents a starting byte of the communication data (namely, Start of TeXt) and $A0, for example, is used as STX 3201, where $ shows that A0 is a numeral in hexadecimal notation. DST 3202 represents ID (identification) of a transmission destination, SRC 3203 represents ID of an origin of transmission (Source). For example, when the ID of the first intruding object monitoring apparatus 101 is 1 and the ID of the second intruding object monitoring apparatus 102 is 2 and when the first intruding object monitoring apparatus 1 sends communication data to the second intruding object monitoring apparatus 102, DST=2 and SRC=1. COM 3204 represents the content (Command) of the communication data. The data of COM 3204 is used to indicate whether the communication data is a following assignment request, a tracking result or a following result. For example, COM=1 in the case of a following assignment request, COM=2 in the case of a tracking result and COM=3 in the case of a following result. DT1 3205 and DT2 3206 represent additional information 1 (Data 1) and additional information 2 (Data 2) and are used in combination with COM 3204 which is the content of communication data. For example, in the case of the following assignment request (COM=1), it is required to send information on the location of an object to be followed to the second intruding object monitoring apparatus. This is done such that X coordinate value of the object is specified in the additional information 1 (Data 1) and Y coordinate value of the object is specified in the additional information 2 (Data 2). ETX 3207 represents end byte of the communication data (End of TeXt) and $AF is used as ETX 3207.

By using the above-mentioned communication data, it is possible to transmit/receive following assignment requests, following results of objects, tracking results of objects among a plurality of intruding object monitoring apparatuses. Note that although the communication data is a 7 byte data string in the above explanation, it is a matter of course that the communication data may be a data string of a desired byte length other than 7 bytes and that the data length may be made variable in accordance with the content of data to be transmitted.

At the all detected object completion judging step 208, if the intruding object tracking step 204 or intruding object following step 207 has been executed for all objects detected at the intruding object detecting step 202, then the flow returns to the image input step 201, whereas if there is any object for which the intruding object tracking step 204 or intruding object following step 207 is still not executed, then the flow returns to the newly detected object judging step 203.

In the second intruding object monitoring process shown in FIG. 3, at a following assignment waiting step 301, the flow stands by until the position of the detected object and a following assignment signal are transmitted from the first intruding object monitoring process via the second communication I/F 102*h*.

At a following assignment judging step 302, when the following assignment signal is received, the flow advances to a camera pan/tilt control step 303, whereas if not, the flow returns to the following assignment waiting step 301.

At the camera pan/tilt control step 303, in accordance with the intruding object position received at the following assignment waiting step 301, the pan/tile controller 102*l* is activated via the second output I/F to move the camera pan/tilt head 102*m* and capture the intruding object 1001

(FIG. 10) detected by the first intruding object monitoring process in the view field 1005 (FIG. 10) of the second camera 102a.

Figure 10:
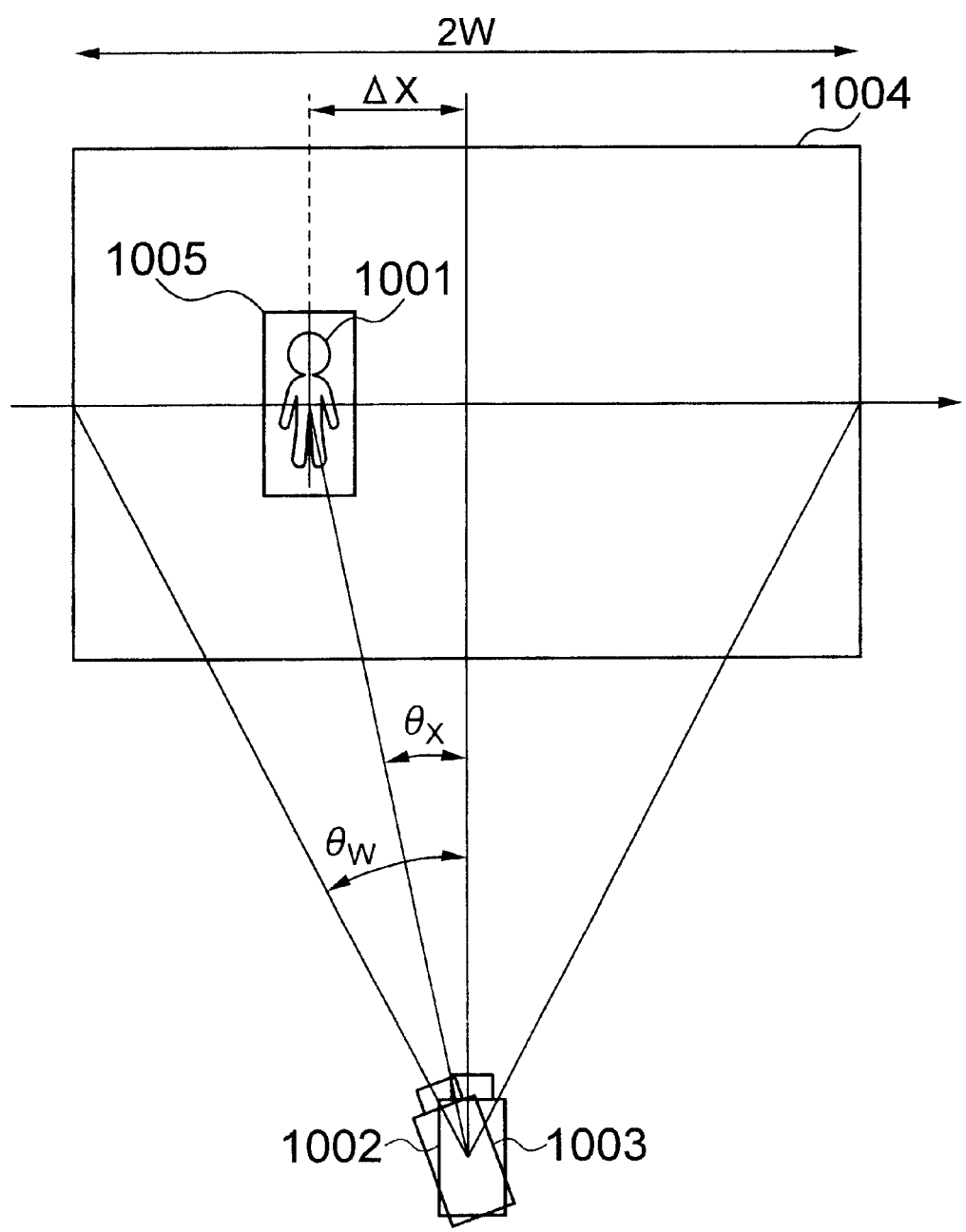
FIG. 10 is a diagram illustrating how a second camera performs following of an intruding object detected with a first camera.

The control amounts (pan angle, tilt angle) of the camera pan/tilt head 102m are calculated, for example, by the method described with FIG. 10.

Next, at an image input step 304, an input image having, for example, a width of 320 pix, a height of 240 pix and 8 bit/pix, is acquired from the second camera 102a.

At an initial template forming step 305, in accordance with the input image acquired at the image input step 304, an intruding object detecting process described with FIG. 9 is executed to store the detected intruding object in the second image memory 102d as a template image.

Next, at an image input step 306, similar to the input image input step 304, an input image is acquired.

At an intruding object following step 307, in accordance with the template image stored in the second image memory 102d, template matching is performed between the stored template image and the input image acquired at the image input step 306 to thereby detect a position change amount of the intruding object detected in the first intruding object monitoring process to thereby perform following of the intruding object.

"Template matching" detects the position of an image registered as a template image. This technique is explained in a book entitled "Introduction to Computer Image Processing", at pp. 118–125, published in 1985 by SOH-KEN Publishing Co. and supervised by Hideyuki Tamura.

"Template matching" is also disclosed in Azriel Rosenfeld et al. "Digital Picture Processing" published by ACADEMIC PRESS, pp. 296–303, 1976, U.S. Pat. No. 5,554, 983 and U.S. Ser. No. 09/592,996, and the disclosures of "Digital Picture Processing", U.S. Pat. No. 5,554,983 and U.S. Ser. No. 09/592,996 are hereby incorporated by reference herein.

Next, at a following failure judging step 308, if the intruding object registered as a template image at the intruding object following step 307 cannot be detected, a following result is transmitted to the first intruding object monitoring apparatus 101 via the second communication I/F 102h to thereafter return to the following assignment waiting step 301.

If the intruding object is detected, position information on the intruding object as well as the following result is transmitted to the first intruding object monitoring apparatus 101 via the second communication I/F 102h to thereafter advance to a template update step 309. Left-sided bold arrows shown in FIG. 3 indicate that information resulted from processing is transmitted from the second intruding object monitoring process to the first intruding object monitoring apparatuses which executes the first intruding object monitoring process.

At a template updating step 309, by using the image of the intruding object detected through template matching, the template image stored in the second image memory 102d is updated.

Next, at a camera pan/tilt control step 310, the pan/tilt controller 102l is activated via the second output I/F in accordance with position information of the intruding object detected at the intruding object following step 307 through template matching.

Specifically, if the intruding object exists in the upper area of the screen, the tilt angle of the camera pan/tilt head 102m is changed upward by a proper amount, whereas if the intruding object exists in the lower area of the screen, the tilt angle of the camera pan/tilt head 102m is changed downward by a proper amount.

If the intruding object exists in the left area of the screen, the pan angle of the camera pan/tilt head 102m is changed leftward by a proper amount, whereas if the intruding object exists in the right area of the screen, the pan angle of the camera pan/tilt head 102m is changed rightward by a proper amount.

In this embodiment, although one first intruding object monitoring apparatus and one second intruding object monitoring apparatus are used, a plurality of second intruding object monitoring apparatuses may also be used.

According to this embodiment, the first and second intruding object monitoring processes are independently controlled such that the first intruding object monitoring process is controlled under the control of the CPU 101c of the first intruding object monitoring apparatus 101 and the second intruding object monitoring process is controlled under the control of the CPU 102c of the second intruding object monitoring apparatus 102. By virtue of this, the monitoring process amount can be distributed or decentralized. Even if a plurality of intruding objects exist in the monitor area, each of the intruding objects is assigned to one of a plurality of second intruding object monitoring apparatus to perform following of an intruding object to which the following is assigned, without increasing the total monitoring process amount.

Figure 4:
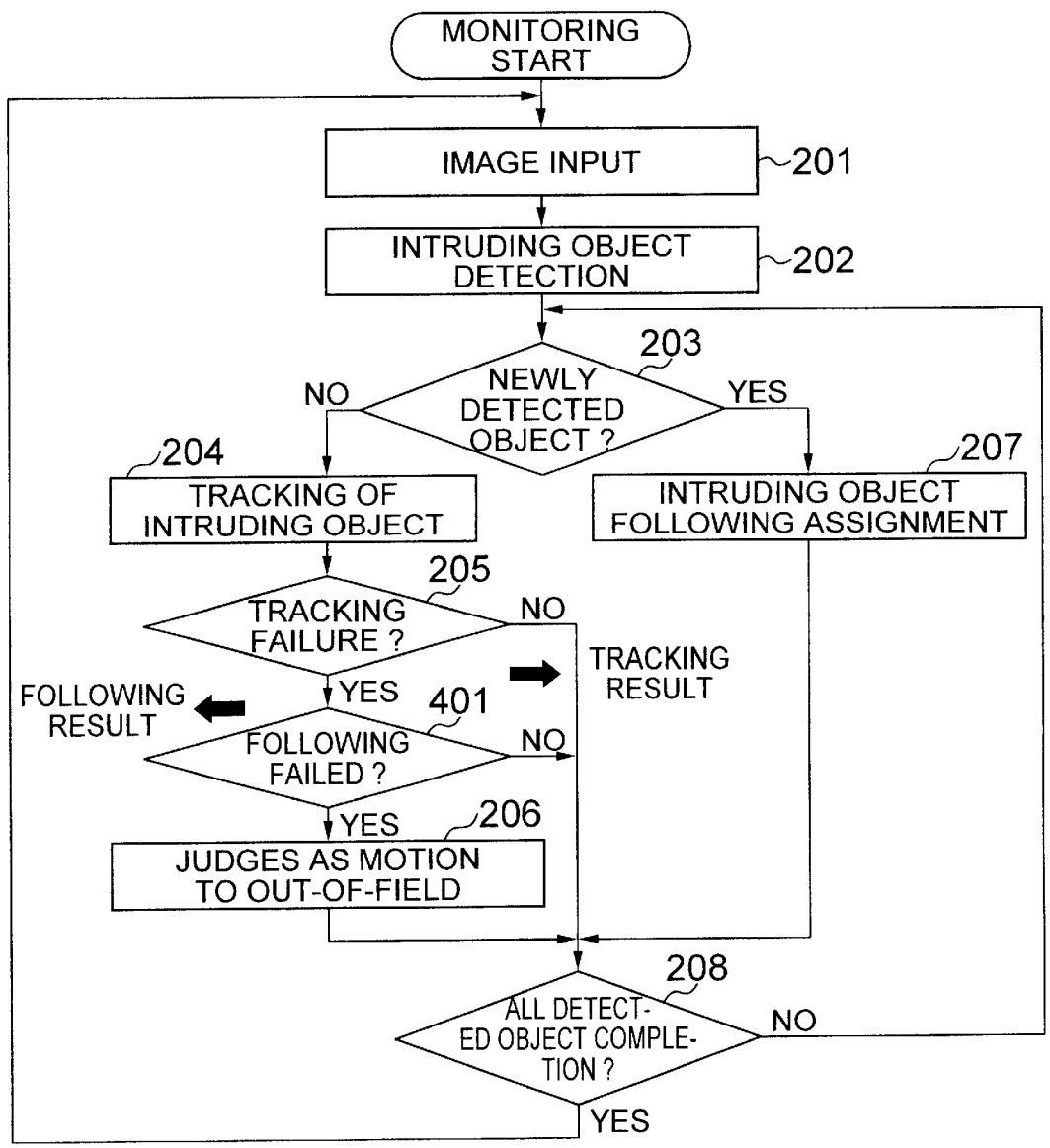
FIG. 4 is a flow chart illustrating an intruding object monitoring method according to another embodiment of the invention.
Figure 5:
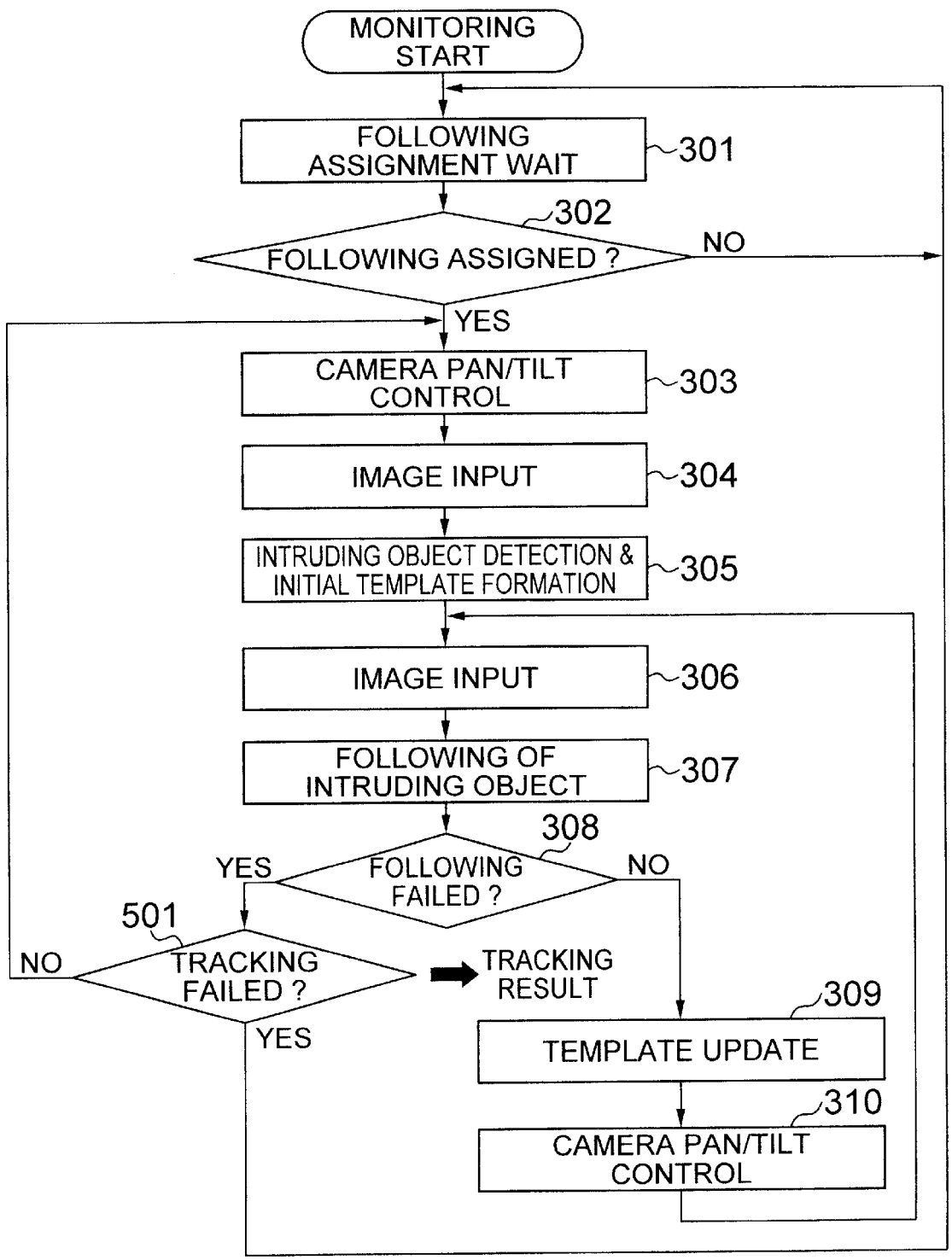
FIG. 5 is a flow chart illustrating the intruding object monitoring method of the embodiment shown in FIG. 4.

FIGS. 4 and 5 are flow charts illustrating an intruding object monitoring method according to another embodiment of the invention.

In this embodiment, even if the first intruding object monitoring process cannot perform tracking, the first intruding object monitoring process can continue the tracking in accordance with a following result supplied from the second intruding object monitoring process.

Further, in this embodiment, even if the second intruding object monitoring process cannot perform following, the second intruding object monitoring process can continue the following in accordance with a tracking result supplied from the first intruding object monitoring process.

In the flow chart shown in FIG. 4, a following failure judging step 401 is inserted between the tracking failure judging step 205 and out-of-view judging step 206 shown in the flow chart of FIG. 2.

In the flow chart shown in FIG. 5, a tracking failure judging step 501 is inserted in the flow path from the following failure judging step 308 to following assignment waiting step 301 shown in the flow chart of FIG. 3.

In FIG. 4 or 5, the steps excepting an added step are the same as those shown in FIG. 2 or 3, and so the description thereof is omitted.

If it is judged as a tracking failure at the tracking failure judging step 205, the tracking result is transmitted to the second intruding object monitoring apparatus 102 via the first communication I/F 101h to thereafter advance to the following failure judging step 401.

At the following failure judging step 401, if the following failure judging step 308 (FIG. 5) in the second intruding object monitoring process judges as a following failure as obtained via the communication I/F 101h (i.e., if both the first and second intruding object monitoring processes miss the intruding object), the flow advances to the next out-of-view motion judging step 206.

If the following still continues, the flow advances to the all detected object completion judging step 208.

At the out-of-view motion judging step 206, a signal is sent to the monitor 103 via the image switching/synthesizing apparatus 106 so that the monitor 103 displays a notice of, for example, "intruding object missed" to thereafter advance to the all detected object completion judging step 208.

In the flow chart shown in FIG. 5, at the tracking failure judging step 501, if the tracking failure judging step 205 (FIG. 4) in the first intruding object monitoring process judges as a tracking failure as obtained via the communication I/F 101h (i.e., if both the first and second intruding object monitoring processes miss the intruding object), the flow returns to the following assignment waiting step 301.

If the tracking still continues in the first intruding object monitoring process, the flow returns to the camera pan/tilt control step 303 to continue the following of the intruding object.

According to this embodiment, the first and second intruding object monitoring apparatus are controlled independently, and if one of the first and second intruding object monitoring processes can detect the intruding object, the monitoring process can be performed continuously so that reliability of the monitoring system can be improved.

Figure 6:
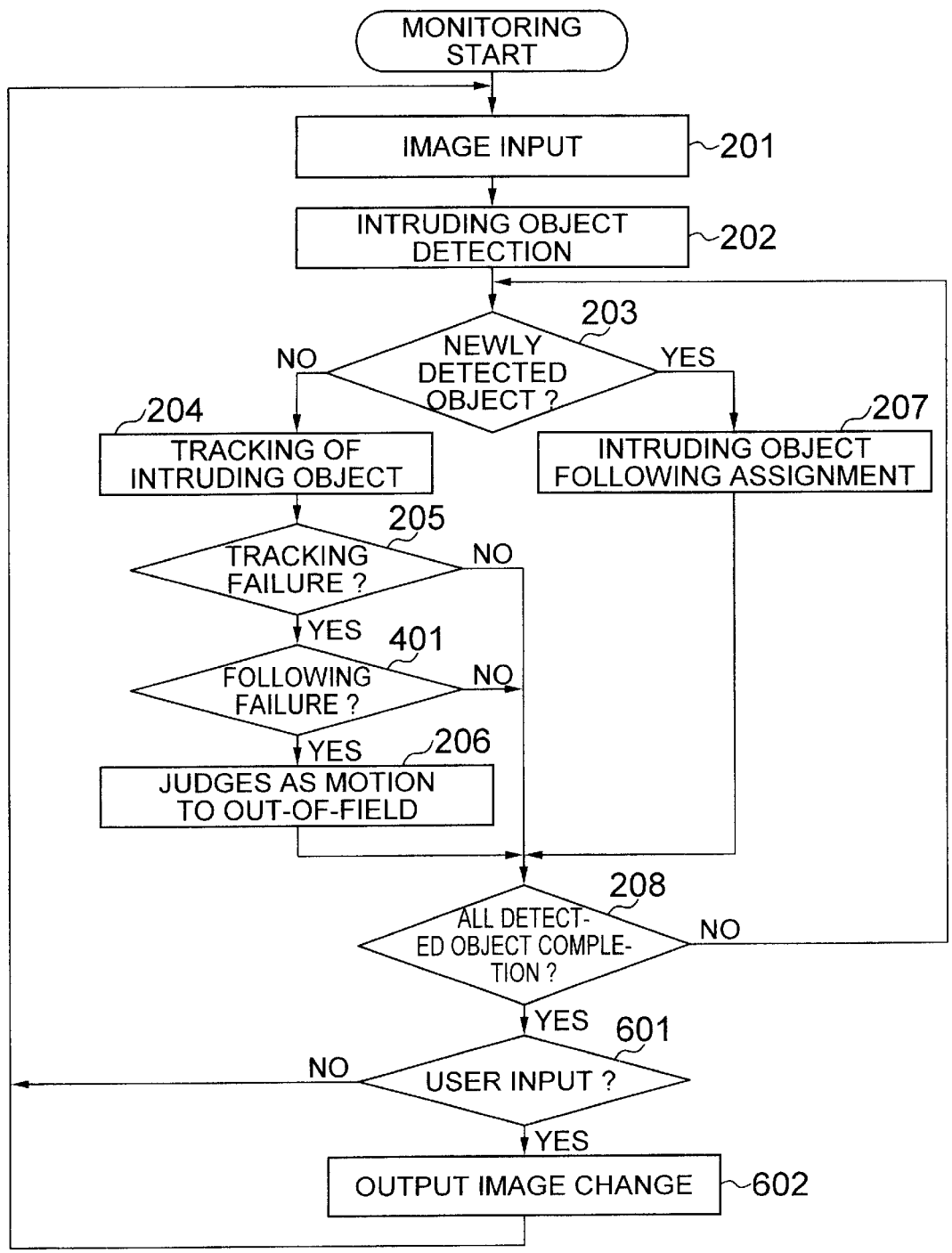
FIG. 6 is a flow chart illustrating an intruding object monitoring method according to another embodiment of the invention.

FIG. 6 is a flow chart illustrating an intruding object monitoring method according to still another embodiment of the invention.

In this embodiment, in the first intruding object monitoring process, in accordance with a user operation input from the input apparatus 105 via the input I/F 101g, a monitor result image on the monitor 106 is changed.

In the flow chart shown in FIG. 6, a user input judging step 601 and an output image switching step 602 are added after the all detected object completion judging step 208 in the flow chart shown in FIG. 4, and these added steps are executed if it is judged that all detected objects have been processed completely.

At the user input judging step 601 in the flow chart shown in FIG. 6, a user input from the input device 105 is monitored via the input I/F 101g. If a user operates upon the input device 105, the flow advances to the output image switching step 602, whereas if there is no user input, the flow returns to the image input step 201.

At the output image switching step 602, in accordance with the user input, the image switching/synthesizing apparatus 106 is controlled to change the monitor result image to be displayed on the monitor 106.

Figure 7:
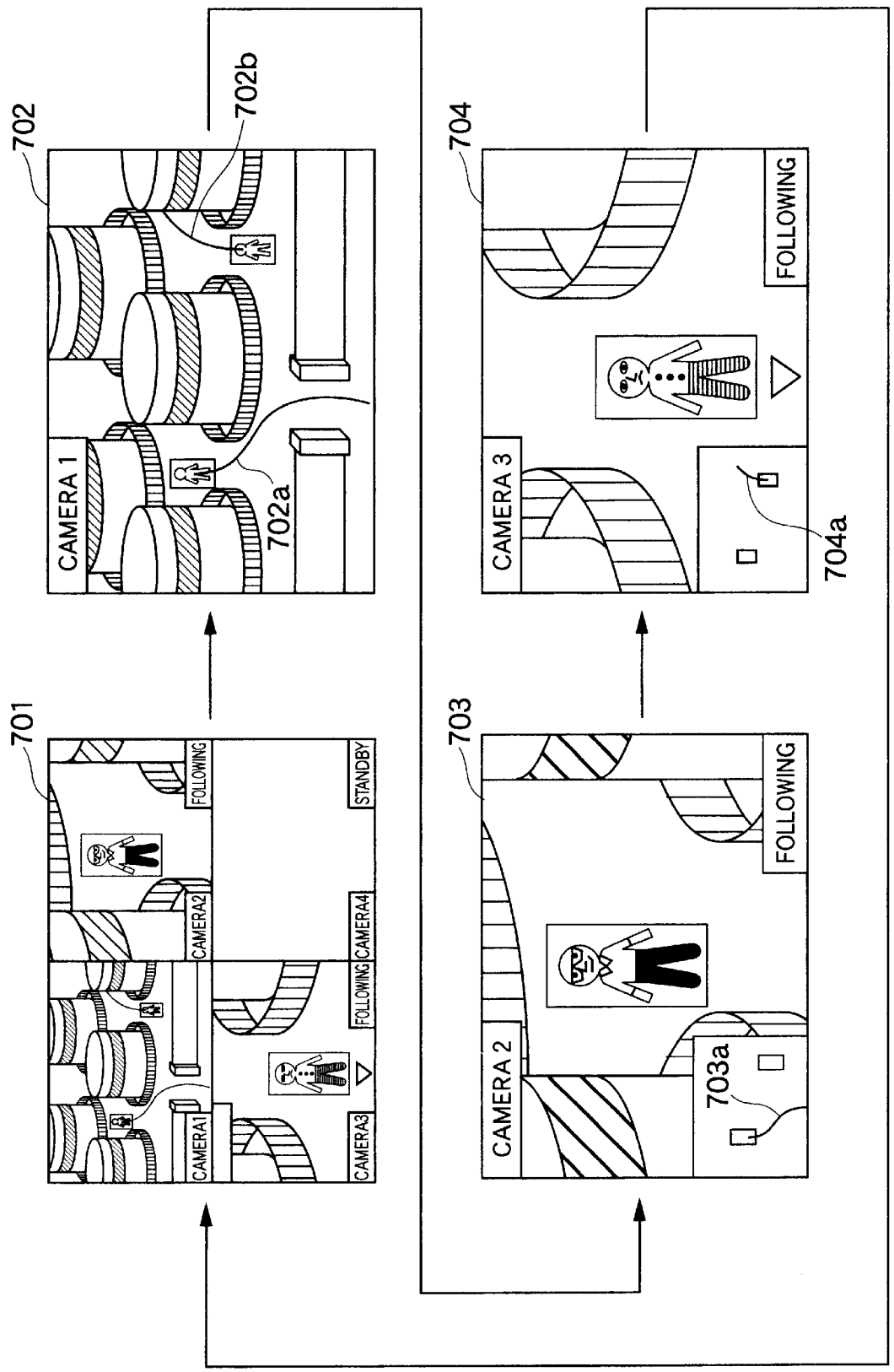
FIG. 7 is a diagram showing the examples of images displayed on a monitor of an intruding object monitoring system of the invention.
Figure 8:
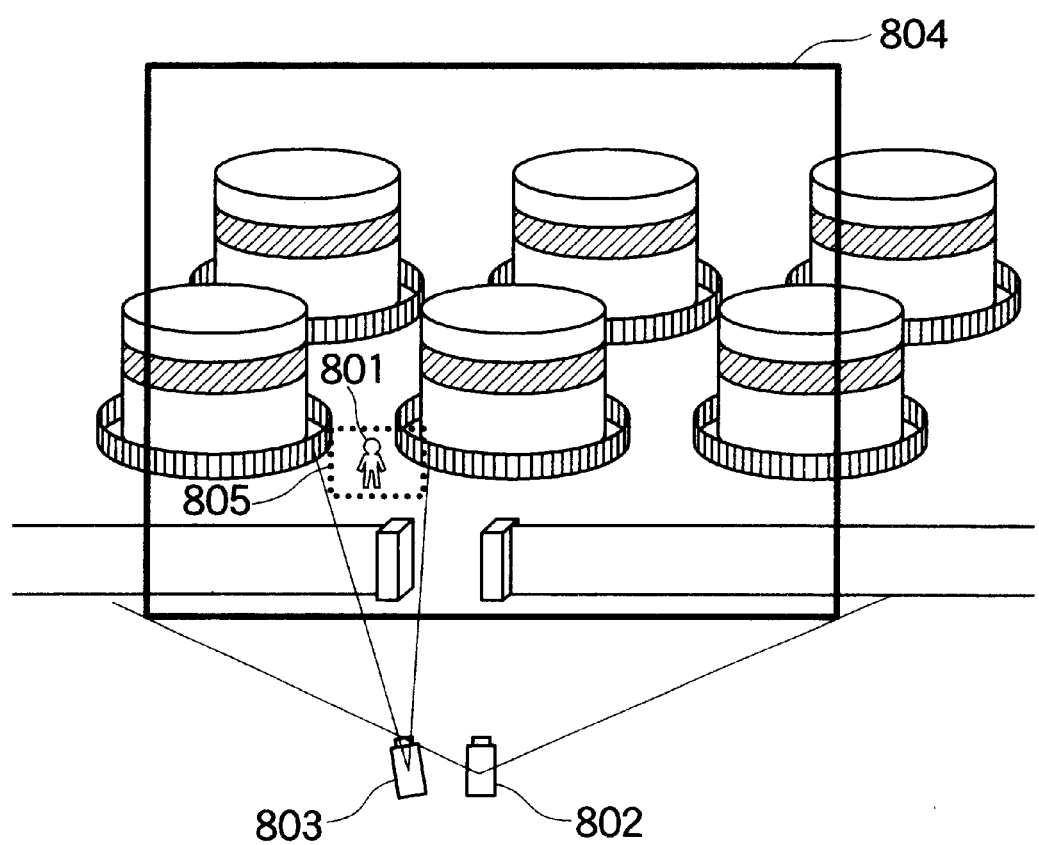
FIG. 8 is a diagram illustrating a monitoring system using two types of cameras.

FIG. 7 shows an example of images of a monitor result displayed on the monitor 106 of the intruding object monitoring system having one first intruding object monitoring apparatus and three second intruding object monitoring apparatuses.

FIG. 7 shows two intruders in the monitor area. The first one (i.e. camera 2 being displayed on the monitor 103) and second one (i.e. camera 3 being displayed on the monitor 103) of the second intruding object monitoring apparatuses perform the following of the intruders, and the third one (i.e. camera 4 being displayed on the monitor 3) of the second intruding object monitoring apparatuses is in a standby state (executing the following assignment waiting step 301 and following assignment judging step 302).

Monitor result images 701 taken with four cameras are displayed in four windows. A monitor result image 702 taken with the first intruding object monitoring apparatus shows the motion loci of two intruders in the view field. A monitor result image 703 taken with the first one of the second intruding object monitoring apparatuses shows countenance and fine motion of the intruder and a rough motion locus 703a of the intruder in the lower left area of the screen for confirmation purposes. Similar to the monitor result image 703, a monitor result image 704 taken with the second one of the second intruding object monitoring apparatuses shows countenance and fine motion of the intruder and a rough motion locus 704a of the intruder in the lower left area of the screen for confirmation purposes.

These monitor result images are sequentially displayed in response to each user input, in the order of monitor result images 701, 702, 703, 704, 701, . . . (the image to be taken with the third one of the second intruding object monitoring apparatuses is skipped because of the standby state).

According to this embodiment, in response to a user or guard man input, important information for guard business such as a motion path and fine countenance of an intruding object can be supplied to the user.

As described above, according to the embodiments, the first and second intruding object monitoring processes are independently controlled such that the first intruding object monitoring process is controlled under the control of the CPU 101c of the first intruding object monitoring apparatus 101 and the second intruding object monitoring process is controlled under the control of the CPU 102c of the second intruding object monitoring apparatus 102. By virtue of this, a plurality of intruding objects in the area to be subjected to monitoring processing can be followed. It is therefore possible to distribute the process amount of the monitoring system. Further, even if one of the intruding object monitoring apparatuses fails to locate an intruding object, the monitoring the intruding object can be made continuously using information of the intruding object received via the communication cable 107 or the like if the other of the intruding object monitoring apparatuses can detect the object. Monitoring is therefore possible which is fast, efficient, and correct. The monitoring performance of an intruding object can be improved considerably and the application field of an intruding object monitoring system can be widened broadly.

Next, an intruding object monitoring system according to another embodiment of the invention will be described. The intruding object monitoring system of this embodiment has a plurality of second intruding object monitoring apparatuses. Each second intruding object monitoring apparatus 102 is assigned a unique ID (identification) number to distinguish between a plurality of second intruding object monitoring apparatuses. The system having two second intruding object monitoring apparatuses will be described by way of example with reference to FIG. 11.

Figure 11:
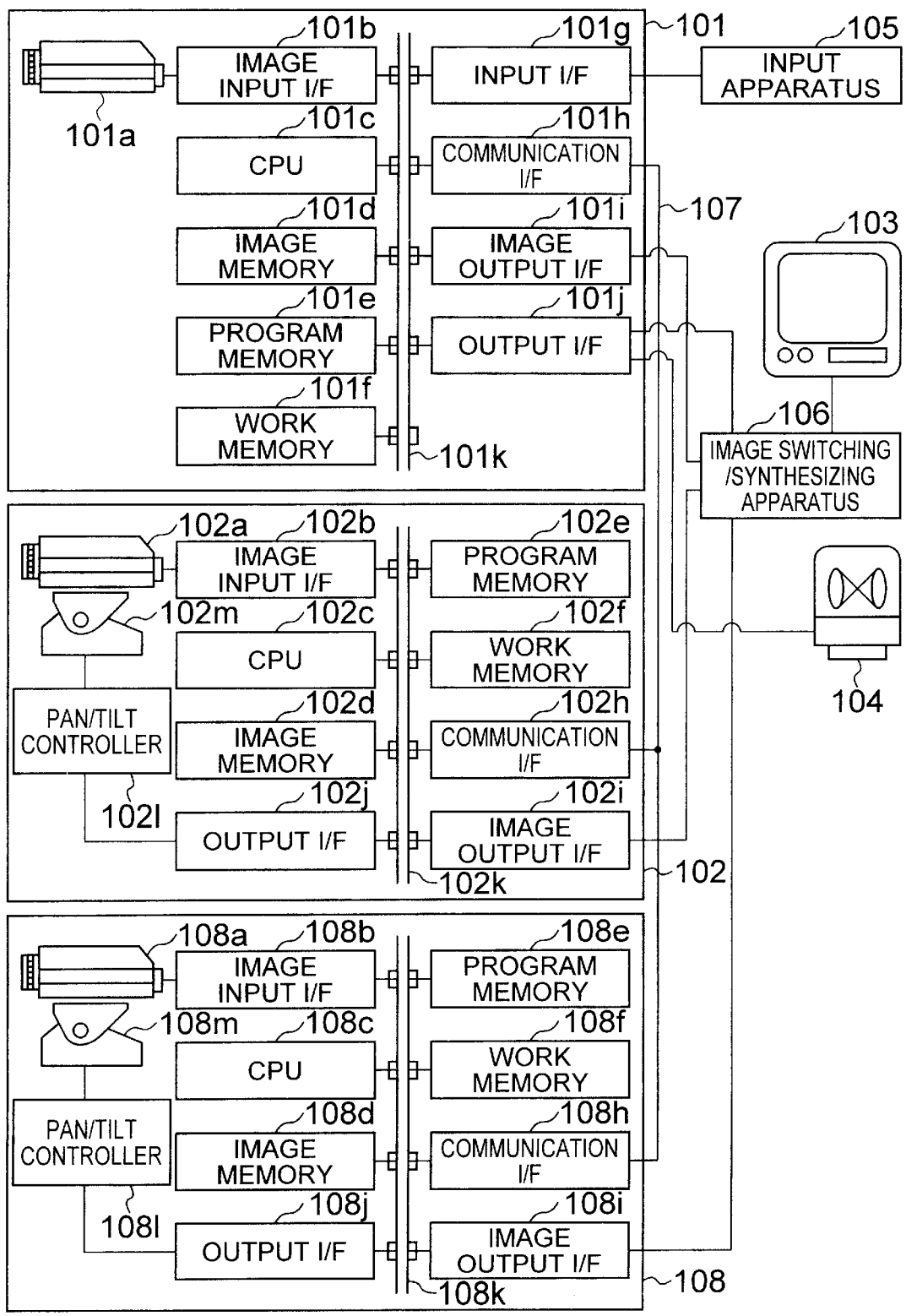
FIG. 11 is a block diagram showing the structure of an intruding object monitoring system according to another embodiment of the invention.

FIG. 11 is a block diagram showing the hardware structure of the intruding object monitoring system. This intruding object monitoring system is constituted of a first intruding object monitoring apparatus 101 and two second intruding object monitoring apparatuses 102 and 108. The structure shown in FIG. 11 has a second intruding object monitoring apparatus 108 added to the intruding object monitoring system shown in FIG. 1. Blocks 108a to 108m constituting the second intruding object monitoring apparatus 108 are same as the blocks 102a to 102m constituting the second intruding object monitoring apparatus 102. In the block diagram showing the hardware structure, a first communication I/F 101h, a second communication I/F 102h and another communication I/F 108h are connected together by a communication cable 107. A first image output I/F 101i, a second image output I/F 102i and another image output I/F 108i are connected to an image switching/synthesizing apparatus 106.

Figure 12:
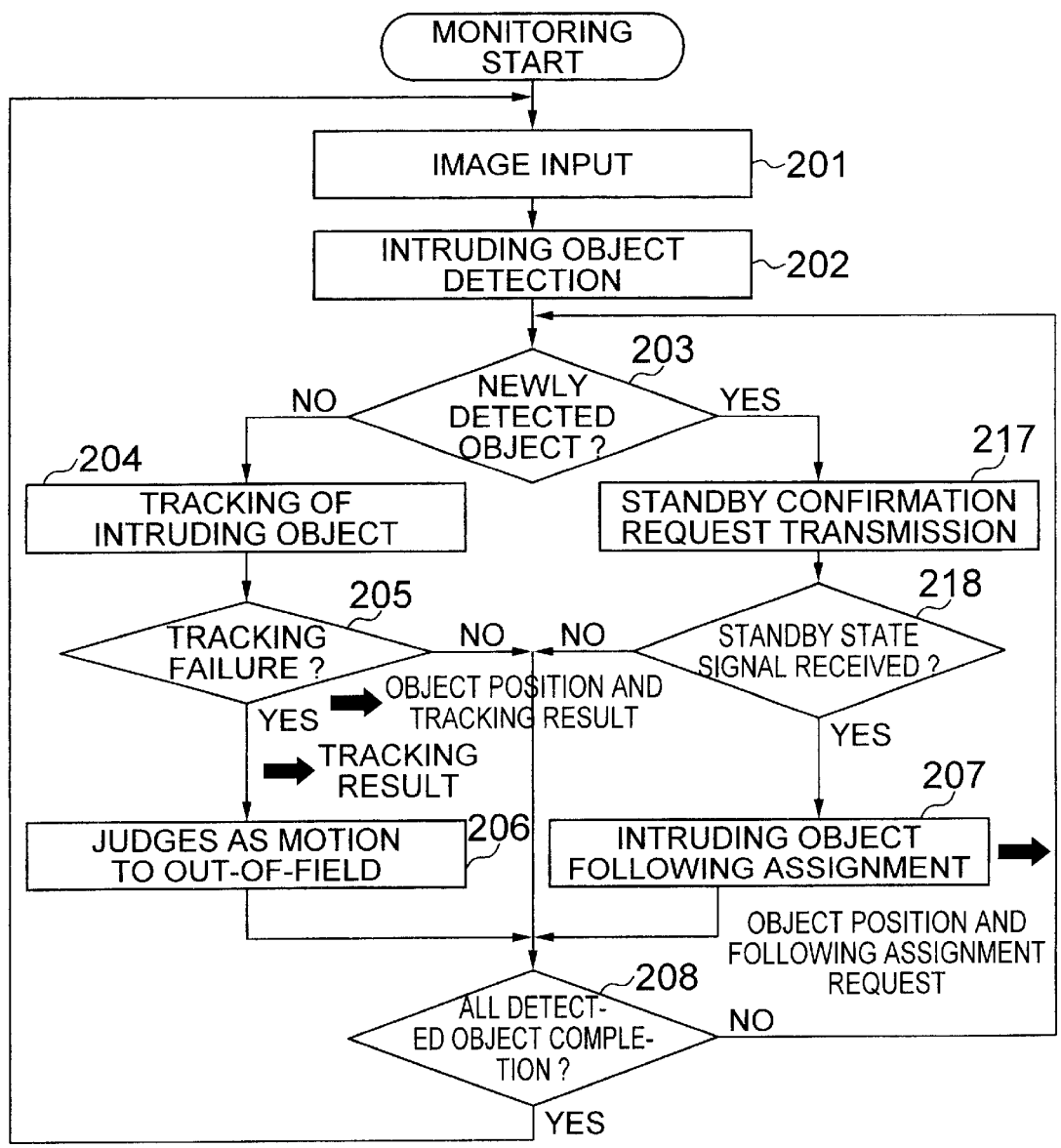
FIG. 12 is a flow chart illustrating an intruding object monitoring method according to another embodiment of the invention.
Figure 13:
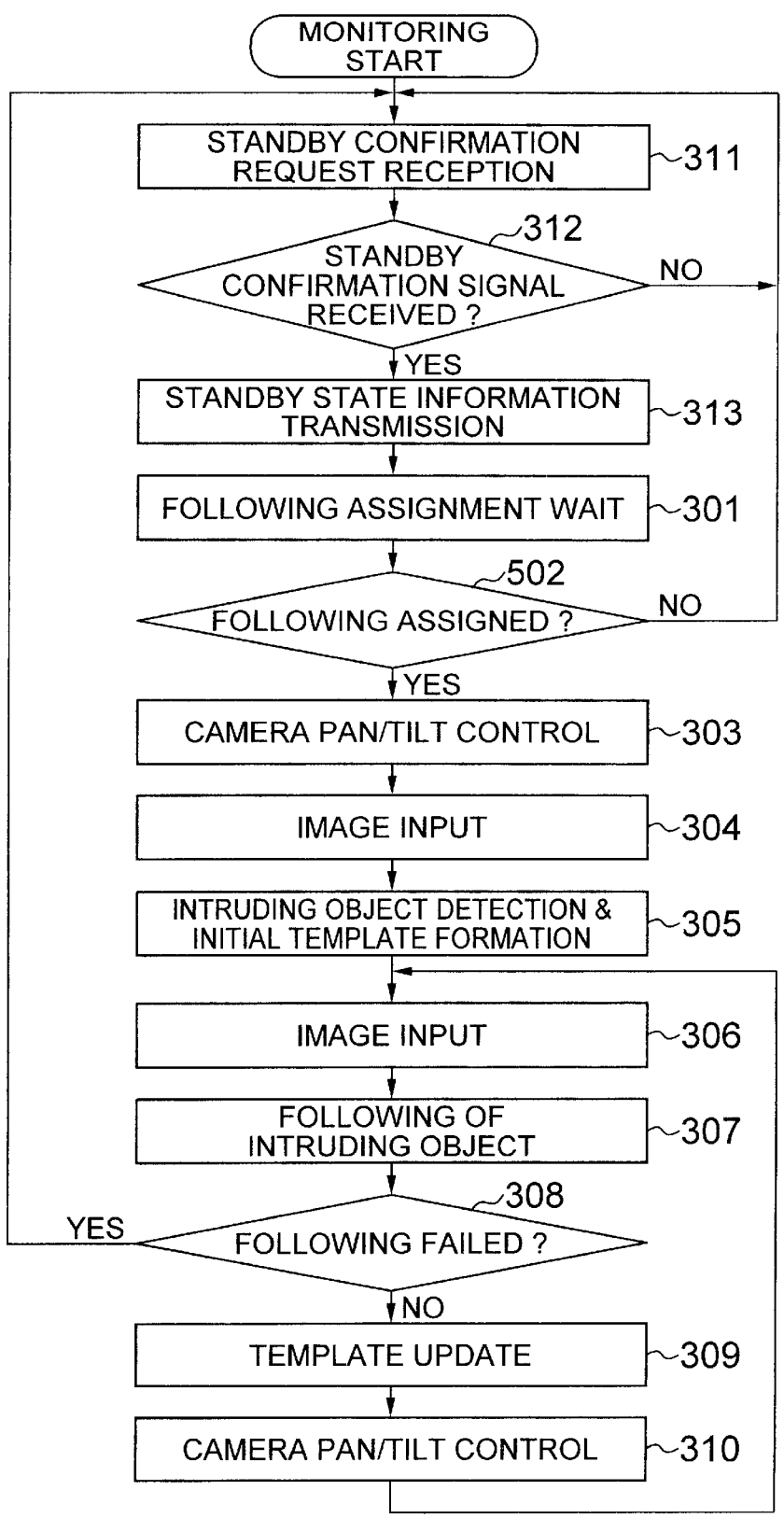
FIG. 13 is a flow chart illustrating the intruding object monitoring method of the embodiment shown in FIG. 12.

FIGS. 12 and 13 are flow charts illustrating the processes of an intruding object monitoring method according to still another embodiment of the invention. The flow charts will be described by referring to the intruding object monitoring system shown in FIG. 12.

The method of this embodiment has first and second intruding object monitoring processes which are independently controlled to perform following of an intruding object in the monitor area. Namely, in the first intruding object monitoring process, an intruding object is detected from image signals sequentially input from the first image pickup apparatus (first camera) for taking images in the whole monitor area, and the position change of the detected intruding object is subjected to tracking. In the second intruding object monitoring process, if the first intruding object monitoring process judges that an intruding object exists, the intruding object is detected from image signals sequentially input from the second pickup apparatus (second camera), and the intruding object is subjected to following so as to always capture the intruding image in the view field of the second image pickup apparatus by controlling the pan/tilt head.

FIG. 12 is the flow chart illustrating the first intruding object monitoring process according to an embodiment of the invention. FIG. 13 is the flow chart illustrating the second intruding object monitoring process according to an embodiment of the invention.

The flow chart shown in FIG. 12 has a standby confirmation request transmitting step 217 and a standby state judging step 218 added to the flow chart shown in FIG. 2, and the other steps are similar to those of the flow chart shown in FIG. 2. The flow chart shown in FIG. 13 has a standby confirmation request receiving step 311, a standby confirmation judging step 312 and a standby state information transmission step 313, and the other steps are similar to those of the flow chart shown in FIG. 3.

Referring to FIG. 12, as intruding object monitoring starts, at an image input step 201, an input image having, for example, a width of 320 pix, a height of 240 pix and 8 bit/pix, is acquired from the first camera 101a.

At an intruding object detecting step 202, in accordance with the input image, an intruding object detecting process is performed, for example, in the manner described with FIG. 9.

At a newly detected object judging step 203, the position of the present detected object is compared with the position of the past detected object in the frame preceding by one frame to obtain a change amount of the positions. If the change amount is smaller than a predetermined amount (the amount depending upon a view field angle of the first camera 101a, e.g., 50 pixels), it is judged that the detected object existed in the frame preceding by one frame (i.e., the detected object is not a newly detected object), and the flow branches to an intruding object tracking step 204. If the change amount is equal to or larger than the predetermined amount, it is judged that the detected object is a newly detected object, and the flow branches to a standby confirmation request transmitting step 217.

The processes at steps 204 to 208 are same as those described with FIG. 2.

At the standby confirmation request transmitting step 217, a standby confirmation signal is transmitted via the first communication I/F 101h to all the second intruding object monitoring apparatuses 102 and 108 connected to the communication cable 107.

At the next standby state judging step 218, the first intruding object monitoring apparatus 101 waits for a standby state signal to be supplied from the second intruding object monitoring apparatues 102 and 108 via the first communication I/F 101h.

Upon reception of the standby confirmation signal, each of the second intruding object monitoring apparatuses 102 and 108 does not return a response if it is performing the following of an intruding object. However, the second intruding object monitoring apparatus not performing the following of an intruding object returns a standby state signal added with the assigned ID number to the first intruding object monitoring apparatus 101. The standby state signal includes information about to which part of the monitor area the camera view field is directed, this information being obtained from the control amount of the pan/tilt head lastly used for the following.

In the first intruding object monitoring apparatus 101, if the standby state signal is received in a predetermined time, the flow advances to an intruding object following assigning step 207, whereas if not, the flow branches to an all detected object completion judging step 208. If there is no second intruding object monitoring apparatus capable of being assigned to the intruding object, the all detected object completion judging step 208 executes some user notifying process (such as producing an alarm sound) and stores a record.

Since the standby state signal is added with the ID number for identifying each of the second intruding object monitoring apparatus 102 and 108, it is possible to identify the second intruding object monitoring apparatus which transmitted the standby state signal.

At the intruding object following assigning step 207, in accordance with the ID number added to the standby state signal, a following assignment request together with position information of the intruding object is transmitted to the second intruding object monitoring apparatus for the second intruding object monitoring process to thereafter advance to the all detected object completion judging step 208.

If the first intruding object monitoring apparatus 101 receives only one standby state signal, the following assignment request added with the ID number in the standby state signal is transmitted.

If the first intruding object monitoring apparatus 101 receives a plurality of standby state signals in the predetermined time, e.g., if it receives two standby signals from the second intruding object monitoring apparatuses 102 and 108, the first received standby state signal is selected and the following assignment request added with the selected ID number is transmitted.

At the all detected object completion judging step 208, if the intruding object tracking step 204 or standby confirmation request transmitting step 217 has been executed for all intruding objects detected at the intruding object detecting step 202, then the flow returns to the image input step 201, whereas if not, the flow returns to the newly detected object judging step 203.

Next, the second intruding object monitoring process shown in FIG. 13 will be described. Steps 301 to 310 of this process are similar to those of the process shown in FIG. 3, excepting different points resulted from a plurality of second intruding object monitoring apparatus although only one intruding object monitoring apparatus is used in FIG. 3.

Referring to FIG. 13, at the standby confirmation request receiving step 311 of the second intruding object monitoring process, if a standby confirmation signal is supplied from the first intruding object monitoring process, it is received via the second communication I/F 102h and/or second communication I/F 108h.

At the standby confirmation judging step 312, if the standby confirmation signal is received, the flow advances to a standby state information transmitting step 313, whereas if not, the flow returns to the standby confirmation request receiving step 311.

At the standby state information transmitting step 313, a standby state signal added with the ID number is transmitted via the second communication I/F 102h to the first intruding object monitoring apparatus 101.

The following assignment waiting step 301 stands by for a predetermined time until position information of a detected object and a following assignment signal are transmitted from the first intruding object monitoring apparatus 101 and received via the second communication I/F 102h and/or second communication I/F 108h.

At the following assignment judging step 302, the flow advances to the camera pan/tilt control step 303 if the following assignment signal is received within the predetermined time at the following assignment waiting step 301, whereas if not, the flow returns to the standby confirmation request receiving step 311.

At the camera pan/tilt control step 303, in accordance with the detection information such as the intruding object position received at the following assignment waiting step 301, the pan/tile controller 102l or 108l is activated via the second output I/F 102j or 108j to move the camera pan/tilt head 102m or 108m and capture the intruding object 1001 (FIG. 10) detected by the first intruding object monitoring process in the view field 1005 (FIG. 10) of the second camera 102a or 108a.

The control amounts (pan angle, tilt angle) of the camera pan/tilt head 102m or 108m are calculated, for example, by the method described with FIG. 10.

At a next image input step 304, an input image having, for example, a width of 320 pix, a height of 240 pix and 8 bit/pix, is acquired from the second camera 102a or 108a.

At an initial template forming step 305, in accordance with the input image acquired at the image input step 304, an intruding object detecting process described with FIG. 9 is executed to store the detected intruding object in the second image memory 102d or 108d as a template image.

At a next image input step 306, similar to the input image input step 304, an input image is acquired. However, the input image acquired at the image input step 306 is an image in the frame after the lapse of the process time required for the steps from the image input step 304 to the image input step 306.

At an intruding object following step 307, based on the template image stored in the second image memory 102d or 108d, template matching is performed between the stored template image and the input image acquired at the image input step 304 to thereby detect a position change amount of the intruding object detected in the first intruding object monitoring process and to perform following of the intruding object.

Next, at a following failure judging step 308, if the intruding object registered as a template image at the intruding object following step 307 cannot be detected, a following result is transmitted to the first intruding object monitoring apparatus 101 via the second communication I/F 102h or 108h to thereafter return to the standby confirmation request receiving step 311.

If the intruding object is detected, position information of the intruding object as well as the following result is transmitted to the first intruding object monitoring apparatus 101 via the second communication I/F 102h or 108h to thereafter branch to a template updating step 309.

At a template updating step 309, by using the image of the intruding object detected through template matching, the template image stored in the second image memory 102d or 108d is updated.

At a next camera pan/tilt control step 310, the pan/tilt controller 102l or 108l is activated via the second output I/F 102h or 108h in accordance with position information of the intruding object detected at the intruding object following step 307 through template matching.

Specifically, if the intruding object exists in the upper area of the screen, the tilt angle of the camera pan/tilt head 102m or 108m is changed upward by a proper amount, whereas if the intruding object exists in the lower area of the screen, the tilt angle of the camera pan/tilt head 102m or 108m is changed downward by a proper amount.

If the intruding object exists in the left area of the screen, the pan angle of the camera pan/tilt head 102m or 108m is changed leftward by a proper amount, whereas if the intruding object exists in the right area of the screen, the pan angle of the camera pan/tilt head 102m or 108m is changed rightward by a proper amount.

According to this embodiment, the first and second intruding object monitoring processes are independently controlled such that the first intruding object monitoring process is controlled under the control of the CPU 101c of the first intruding object monitoring apparatus 101 and the second intruding object monitoring process is controlled under the control of the CPU 102c or 108c of the second intruding object monitoring apparatus 102 or 108. By virtue of this, the monitoring process amount can be distributed. Even if a plurality of intruding objects exist in the monitor area, each of the intruding objects is assigned to one of a plurality of second intruding object monitoring apparatuses to perform following of an intruding object, without increasing the total monitoring process amount. It is obvious that the monitor results can be displayed in the manner described with reference to FIGS. 6 and 7. This can also be applied to other embodiments.

Figure 14:
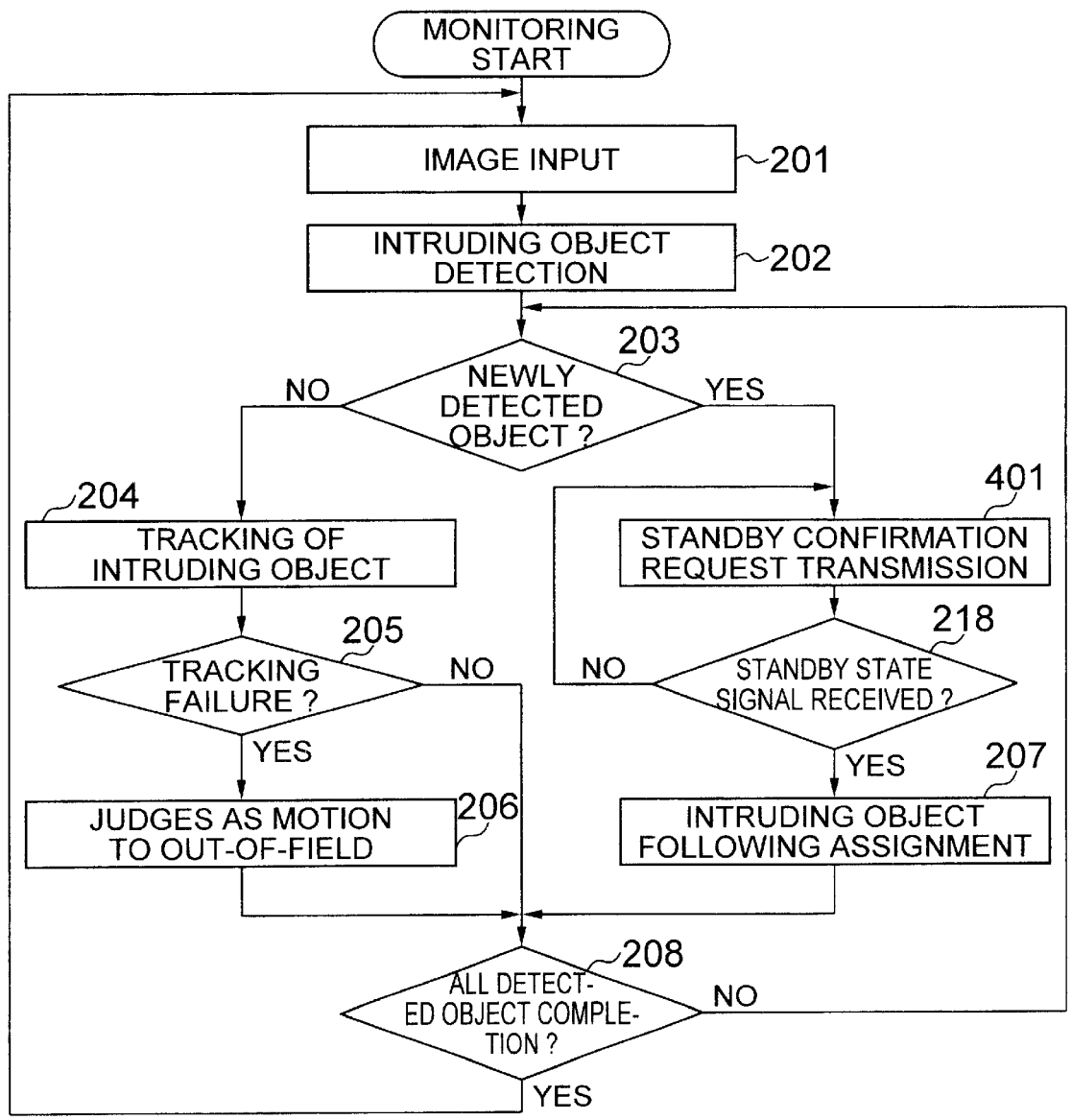
FIG. 14 is a block diagram showing the structure of an intruding object monitoring system according to another embodiment of the invention.

FIG. 14 is a flow chart illustrating an intruding object monitoring method according to two other embodiments of the invention.

In one embodiment, in place of the standby confirmation request transmitting step 217 shown in FIG. 12, a standby confirmation request transmitting step 401 is used which has a processing function different from that of the step 217 and transmits the standby confirmation request signal to the second intruding object monitoring apparatus nearest to an intruding object. At the standby state judging step 218, if the second intruding object monitoring apparatus nearest to the intruding object is in a standby state, the flow advances to the intruding object following assignment step 207 whereat the following of the intruding object is assigned to this second intruding object monitoring apparatus nearest to the intruding object. If the second intruding object monitoring apparatus nearest to the intruding object is not in a standby state (i.e., this apparatus is now performing following), the flow returns to the standby confirmation request transmission step 401 whereat the standby confirmation request signal is transmitted to the second intruding object monitoring apparatus next nearest to the intruding object. If all the second intruding object monitoring apparatuses are performing following, for example, the flow skips to the all detected object completion step 208 without assigning following. The standby confirmation request transmission step 401 calculates the coordinate value (absolute coordinate value) of the detected intruding object in the monitor area in accordance with the coordinate value of the object on the detected image, and compares this calculated coordinate value with the position of the monitor area of each second intruding object monitoring apparatus (stored in the second program memory 102e of the second intruding object monitoring apparatus), to thereby determine the second intruding object monitoring apparatus nearest to the intruding object. The following of the intruding object is assigned to this second intruding object monitoring apparatus at the intruding object following assignment step 207. If it is judged at the standby state judging step 218 that the intruding object monitoring apparatus nearest to the intruding object is performing following, the following of the intruding object is assigned to the second intruding object monitoring apparatus next nearest to the intruding object at the intruding object following assignment step 207.

As described above, at the standby confirmation request transmission step 401 shown in FIG. 14, in accordance with the position of a newly detected intruding object, the second intruding object monitoring apparatus nearest to the coordinate value of the detected intruding object is selected.

Figure 15:
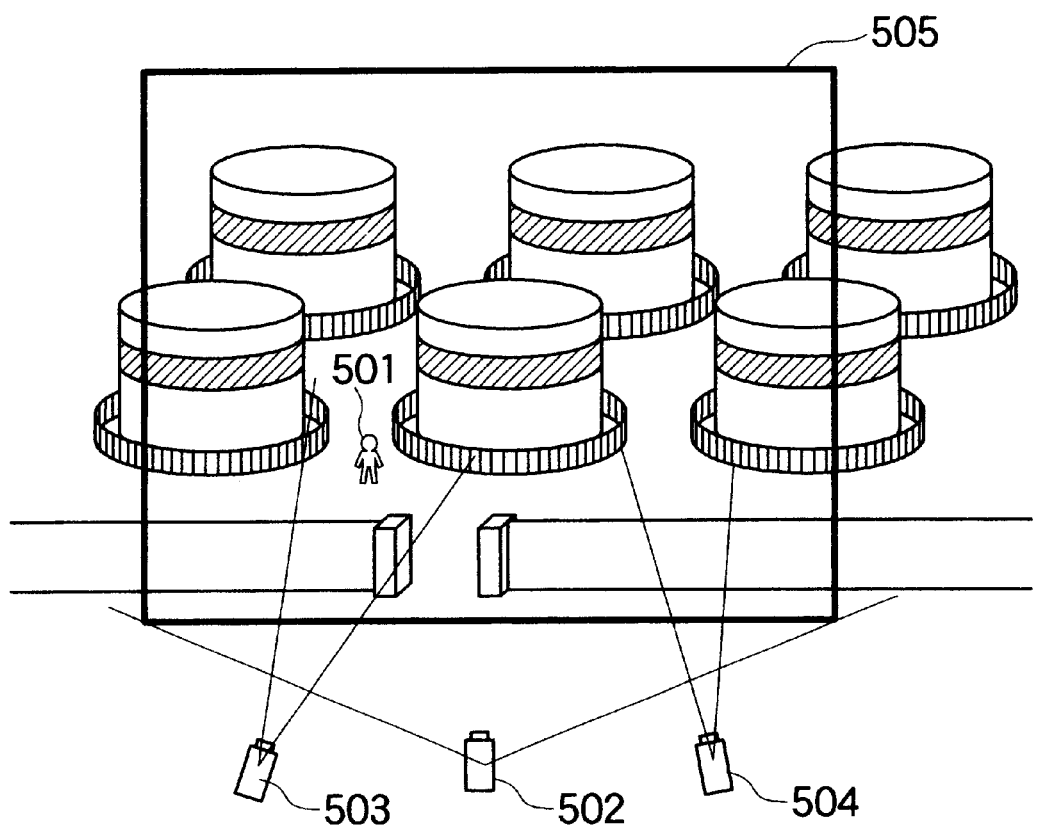
FIG. 15 is a perspective view showing the structure of an intruding object monitoring system according to another embodiment of the invention.

An example of the processes of the flow chart shown in FIG. 14 will be described with reference to FIG. 15. FIG. 15 is a diagram showing an intruding object monitoring system according to an embodiment of the invention. In this embodiment, the system has one first intruding object monitoring apparatus and a plurality of second intruding object monitoring apparatuses. In FIG. 15, only two sets of second intruding object monitoring apparatuses are shown and the others are omitted.

In FIG. 15, it is assumed that a first camera 502 detects an intruding object 501 in a monitor area 505 at the steps 201 and 202 and the step 203 judges that the intruding object is a newly detected intruding object.

In this case, a first intruding object monitoring program stored in the first program memory 101e selects the intruding object monitoring apparatus nearest to the intruding object 501 in accordance with position information of the detected intruding object 501, and transmits a standby confirmation request signal to this apparatus (step 401).

At the next standby state judging step 218, if the selected second intruding object monitoring apparatus is not in the standby state (i.e., it is performing another intruding object), the flow returns to the standby confirmation request transmission step 401, whereas if in the standby state, the flow advances to the step 207.

The standby confirmation request transmission step 401 selects the second intruding object monitoring apparatus next nearest to the intruding object 501 in accordance with position information of each second intruding object monitoring apparatus stored in the second program memory 102e, and transmits the standby confirmation request signal to this selected apparatus.

According to this embodiment, the following of a detected intruding object can be assigned to the second intruding object monitoring apparatus in the order nearest to the object. Reliable and fast following is therefore possible.

Figure 16:
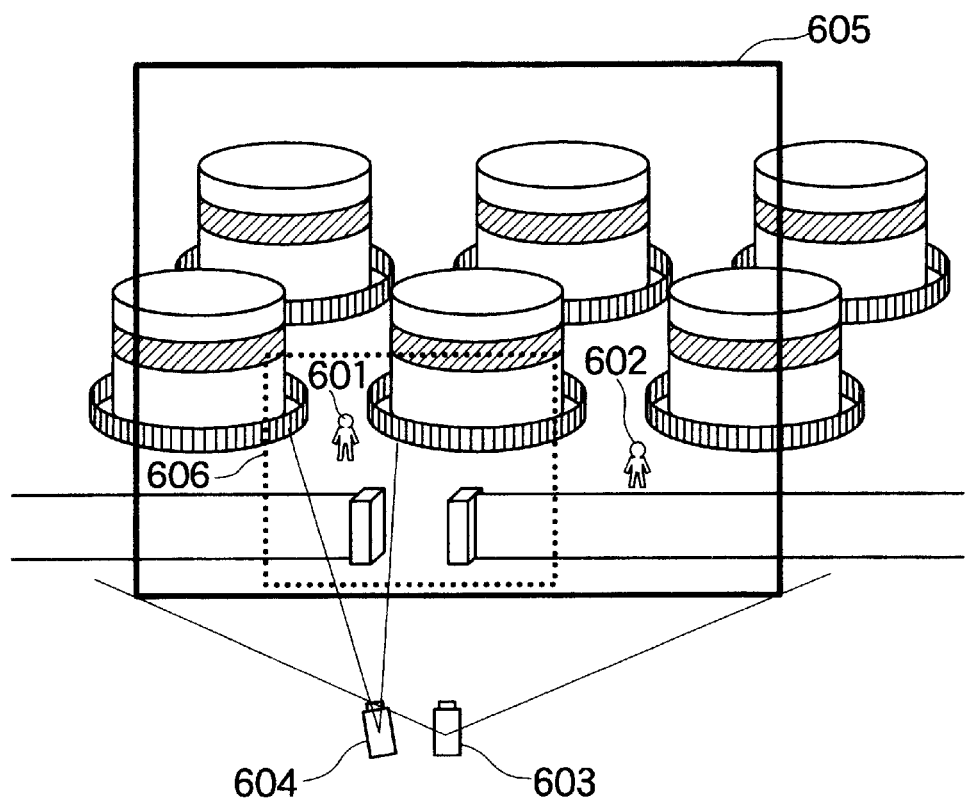
FIG. 16 is a perspective view showing the structure of an intruding object monitoring system according to another embodiment of the invention.

Next, another example of the processes of the flow chart shown in FIG. 14 will be described with reference to FIG. 16. FIG. 16 is a diagram showing an intruding object monitoring system according to an embodiment of the invention. In this embodiment, the system has one first intruding object monitoring apparatus and one second intruding object monitoring apparatus.

In FIG. 16, intruding objects 601 and 602 exist in the whole monitor area 605. In the monitor area 605 of the first camera 603, a monitor sub-area 606 having a high priority is set beforehand. If there are a plurality of intruding objects, the newly detected object judging step 203 judges whether the intruding object detected in the monitor sub-area 606 having the higher priority is a newly detected intruding object. If the intruding object is an object already detected, then the flow branches to the intruding object tracking step 204, whereas if the intruding object is a newly detected intruding object, the flow branches to the standby confirmation request transmission step 401. After the judgement of the detected object in the monitor sub-area 606 having the higher priority is completed, then an object in the monitor area having the next higher priority is judged. In this manner, the judgement is made for monitor sub-areas in the order having the higher priority.

According to the embodiment, the monitor sub-areas in the whole monitor area are given a priority order, and an intruding object among a plurality of objects in the monitor sub-area having the higher priority is assigned to the second intruding object monitoring apparatus. It is therefore possible to quickly and efficiently perform following of an intruding object.

In the above embodiments, if the first intruding object monitoring apparatus 101 receives a plurality of standby state signals in the predetermined time, the following methods are used:

(1) The standby state signal first received is adopted.

(2) The second intruding object monitoring apparatus nearest to the coordinate value of the newly detected intruding object is selected.

In addition to these methods, the second intruding object monitoring apparatus may add the present control information on the pan/tilt head such as a present direction of a camera to the standby state signal. For example, if some area in the monitor sub-area is to be monitored, the second intruding object monitoring apparatus whose camera happens to be directed to this area can be selected properly for the standby confirmation request transmission step 401.

As described above, the first intruding object monitoring apparatus can select the optimum second intruding object monitoring apparatus in accordance with a combination of information such as the control information of the pan/tilt head included in the standby state signal supplied from the second intruding object monitoring apparatus and the camera position information capable of being acquired from the ID number, and can transmit the following request added with a selected ID number.

It is therefore possible to select the optimum conditions under which an intruding object can be monitored quickly, efficiently and reliably.

According to the embodiments described above, the first and second intruding object monitoring apparatus are controlled independently to distribute the process amount and allows the following of a plurality of intruding objects. The detected intruding object can be subjected to the following by using the optimum second intruding object monitoring apparatus.

Further, according to another advantage of the embodiment, the monitor area is divided into sub-areas with a priority order so that the second intruding object monitoring apparatus can be assigned to the sub-area having a higher priority in which an intruding object was detected. Therefore, the monitoring performance for an intruding object can be improved considerably.

As described above, according to the embodiments, even if a plurality of objects intrude into the monitor area, each object can be subjected to the following quickly and efficiently. It is therefore possible to provide an intruding object monitoring system having a high precision and high reliability. Application fields of the intruding object monitoring system can therefore be broadened.

An intruding object monitoring method and an intruding object monitoring system according to still another embodiment will be described.

Figure 17:
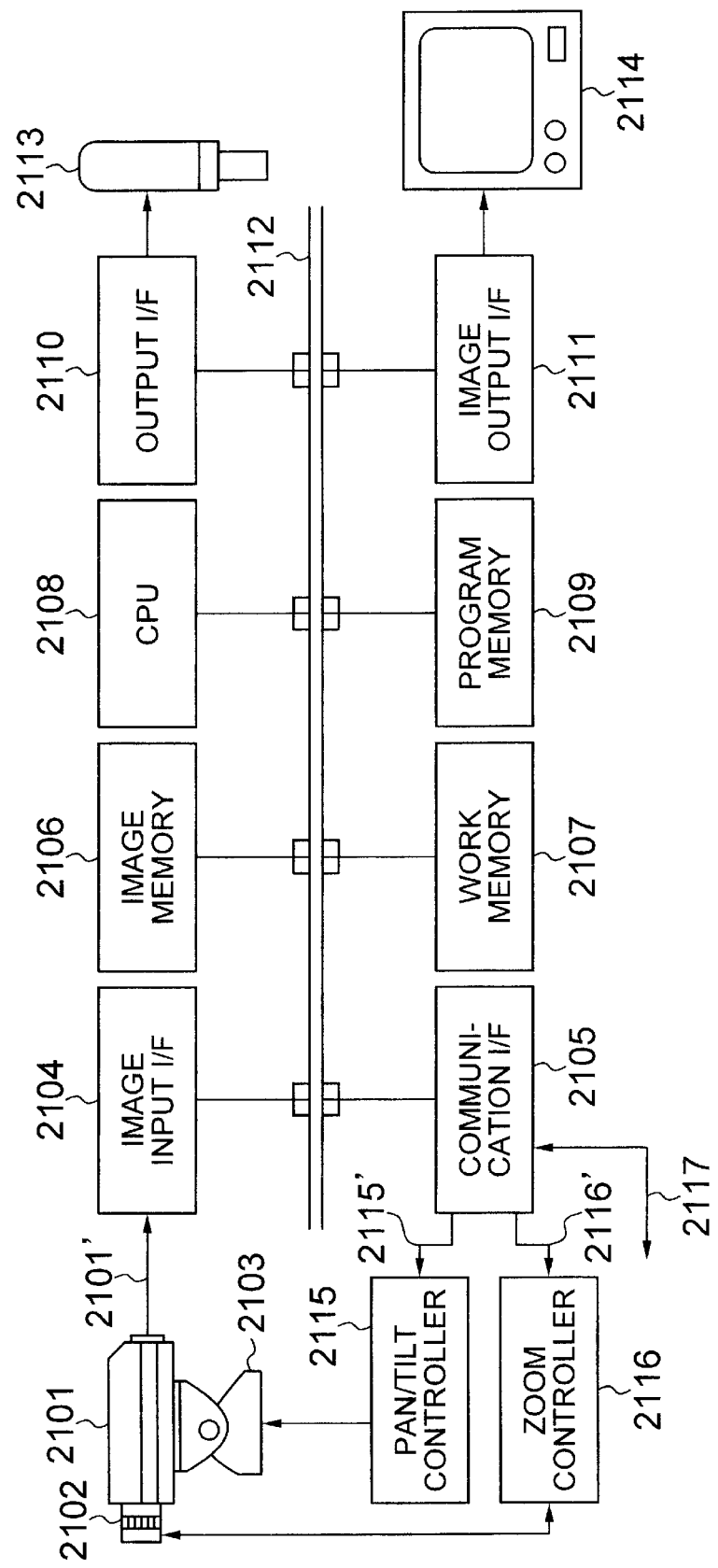
FIG. 17 is a block diagram showing the structure of an intruding object monitoring system using an intruding object monitoring method according to an embodiment of the invention.

FIG. 17 is a block diagram showing an example of an intruding object monitoring system using the intruding object monitoring method of this invention.

In FIG. 17, reference numeral 2101 represents a camera for taking an image in a desired monitor area. Reference numeral 2102 represents a zoom lens mounted on the camera 2101 which can change the image pickup area and the size of an object. Reference numeral 2103 represents a pan/tilt head for panning or tilting the camera 2101. Reference numeral 2116 represents a zoom controller for supplying a zoom control signal to the zoom lens 2102. Reference numeral 2115 represents a pan/tilt controller for supplying a pan/tilt control signal to the pan/tilt head 2103. Reference numeral 2104 represents an image input I/F for converting an image signal 2101' input from the camera 2101 into image data of a predetermined format. Reference numeral 2106 represents an image memory for storing the image data converted by the image input I/F 2104. Reference numeral 2108 represents a CPU for controlling each circuit of the intruding object monitoring system. Reference numeral 2109 represents a program memory for storing a predetermined program which controls CPU 2108. Reference numeral 2107 represents a work memory for storing predetermined image data to be processed. Reference numeral 2105 represents a communication I/F for supplying a zoom control signal 2116' and a pan/tilt head control signal 2115' to the zoom controller 2116 ad pan/tilt controller 2115 and transferring data to and from another intruding object monitoring apparatus. Reference numeral 2110 represents an output I/F for outputting an alarm signal representative of a detection of an intruding object. Reference numeral 2111 represents an image output I/F for outputting an image signal of a picked-up image, an image signal of a detected intruding object and the like. Reference numeral 2112 represents a data bus via which digital data is transferred. Reference numeral 2113 represents an alarm lamp for notifying a detection of an intruding object. Reference numeral 2114 represents a monitor for displaying image signals output from the image output I/F 2111.

The camera 2101 mounted with the zoom lens 2102 is mounted on the pan/tilt head 2103 capable of panning and tilting to take an image of a monitor area which is broader than an imaging range which the camera 2101 with the zoom lens can cover.

The zoom lens 2102 mounted on the camera 2101 is connected to the zoom controller 2116 by a cable, the pan/tilt head 2103 is connected to the pan/tilt controller 2115 by a cable, and the zoom controller 2116 and pan/tilt controller 2115 are connected to the communication I/F 2105.

The communication I/F 2105 is connectable to another intruding object monitoring apparatus by an external communication cable 2117.

The camera 2101 is connected to the image input I/F 2104 by a cable, and an image signal 2101' of a picked-up image is output to the image input I/F 2104.

The monitor 2114 is connected to the image output I/F 2114, and an image signal picked up by the camera 2101, an image signal 2101' of a detected intruding object and the like are output from the image output I/F 2114.

The alarm lamp 2113 is connected to the output I/F 2110, and when an intruding object is detected, a lamp signal is input to the output I/F 2110.

The image input I/F 2104, communication I/F 2105, image memory 2106, work memory 2107, CPU 2108, program memory 2109, output I/F 2110 and image output I/F 2111 are connected to the data bus 2112.

In operation, the camera 2101 is mounted on the pan/tilt head 2103 in order to take an image of the monitor area which is broader than an imaging range of the camera 2101 with the zoom lens 2102. The camera 2101 is panned and tilted by the pan/tilt control signal output from the pan/tilt controller 2115 to change the image pickup direction to a desired direction.

The zoom ratio of zoom lens 2102 mounted on the camera 2101 can be changed in response to the zoom control signal output from the zoom controller 2116.

The camera 2101 supplies an image signal of a predetermined monitor area to the image input I/F 2104.

The image input I/F 2104 converts the image signal of the monitor area input from the camera 2101 into image data of the format (e.g., a width of 320 pix, a height of 240 pix, and 8 bit/pix) compatible with the digital processing unit of the intruding object monitoring apparatus, and supplies the converted image data to the image memory 2106 via the data bus 2112.

The image memory 2106 stores the image data transferred via the data bus 2112.

CPU 2108 reads necessary image data stored in the image memory 2109 to the work memory 2107 and analyzes the image data in the work memory 2107, in accordance with a program stored beforehand in the program memory 2106.

By analyzing the image data, information on an intruding object in the image pickup area of the camera 2101 can be obtained.

In accordance with the analysis result, CPU 2108 instructs the communication I/F 2105 via the data bus 2112 to make the pan/tilt controller 2115 supply a necessary pan/tilt control signal to the pan/tilt head 2103.

In accordance with the analysis result, CPU 2108 instructs the communication I/F 2105 via the data bus 2112 to make the zoom controller 2116 supply a zoom control signal to the zoom lens 2102.

If one or more other intruding object monitoring apparatuses are connected to the external communication cable 2117, CPU 2108 performs necessary communications with another intruding object monitoring apparatus via the communication I/F 2105 and external communication cable 2117.

The above-mentioned one or more other intruding object monitoring apparatuses not shown may be an apparatus having a similar function to that of the intruding object monitoring apparatus shown in FIG. 17. The monitor, alarm lamp and related control units shown in FIG. 17 may be used in common. CPU 2108 controls the pan/tilt controller 2115 and zoom controller 2116 to thereby switch between monitoring modes to be described later. CPU 2108 transfers a following takeover request and a view field magnification request to be described later to and from the above-mentioned other intruding object monitoring apparatus via the external communication cable 2117.

In accordance with the analysis result, CPU 2108 outputs a lamp signal from the output I/F 2110 to the alarm lamp 2113 to turn it on.

In accordance with the analysis result, CPU 2108 outputs an image signal representative of a process result from the image output I/F 2111 to the monitor 2114 to display, for example, an image representative of the process result on the screen.

The communication I/F 2105 converts a control instruction supplied from CPU 2108 into a signal of the format (e.g., RS232C communication signal) recognizable by the pan/tilt controller 2115 and zoom controller 2116 to control the pan/tilt head 2103 and zoom lens 2102. In response to a control instruction supplied from CPU 2108, the communication I/F 2105 performs data communications with one or more other intruding object monitoring apparatus connected by the external communication cable 2117.

In response to a control instruction supplied from CPU 2108, the image output I/F 2111 converts image data into an image signal of the format allowing the monitor 2114 to display it (e.g., NTSC video signal).

The monitor 2114 displays an image of the image signal supplied from the image output I/F 2111, such as an image of an intruding object detection result.

The following description for the flow charts is given with reference to FIG. 17 showing an example of the hardware structure of the intruding object monitoring apparatus.

The operation of the intruding object monitoring method according to an embodiment of the invention will be described with reference to the flow charts shown in FIGS. 18, 19 and 20.

In this embodiment, when an intruding object under the following enters a blind area of the camera of the first intruding object monitoring apparatus, another second intruding object monitoring apparatus for monitoring the monitor area covering such a blind area takes over the following.

Figure 18:
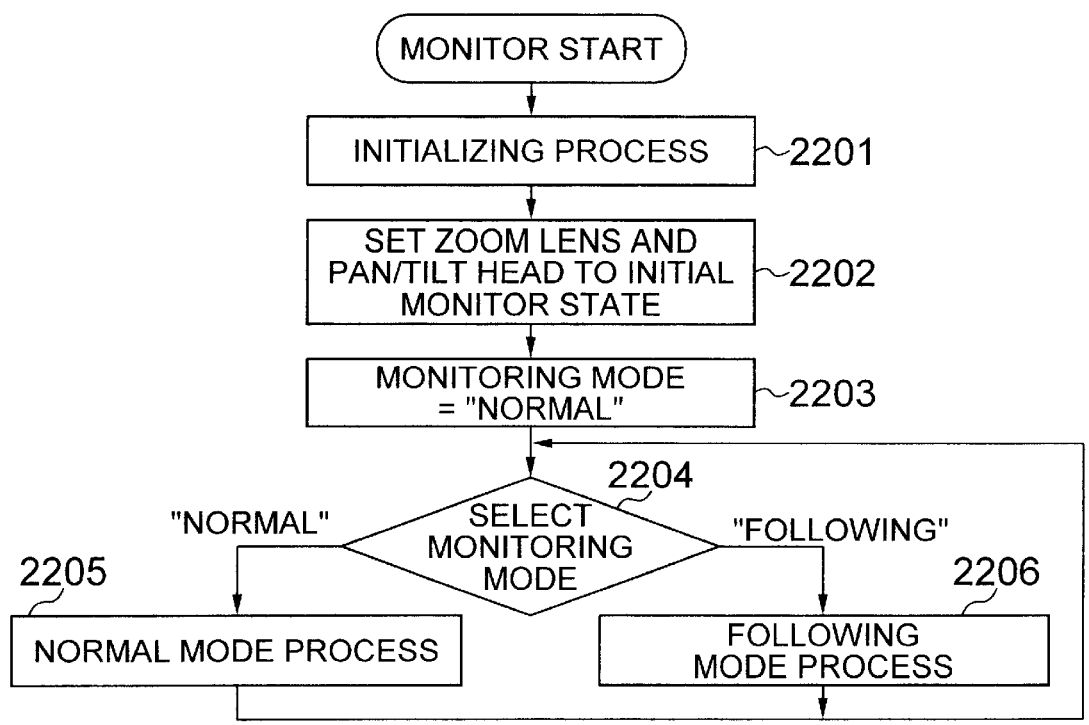
FIG. 18 is a flow chart illustrating an intruding object monitoring method according to another embodiment of the invention.

Referring to FIG. 18, as the first intruding object monitoring apparatus starts monitoring an intruding object, an initializing process is first executed.

At the initializing step 2201, the initializing process is executed for the image memory 2106, work memory 2107 and the like.

Figure 30:
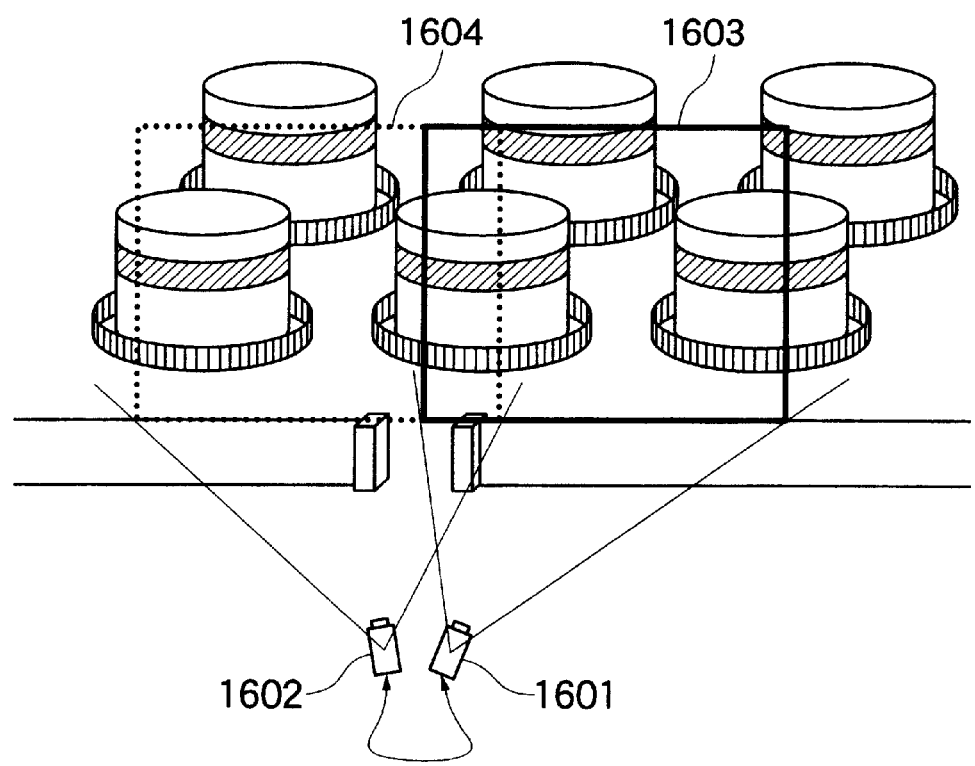
FIG. 30 is a diagram illustrating monitor area allocation to two intruding object monitoring apparatus.

At an initial monitoring state step 2202, the zoom lens 2102 mounted on the camera 2101 and the pan/tilt head 2103 mounting the camera 2101 are reset to predetermined positions. In this case, the view angle of the camera 2101 is set as shown in FIG. 30 to be later described.

At a monitoring mode setting step 2203, the present monitoring mode is set to a "normal" mode.

At a monitoring mode branch step 2204, a normal mode process step 2205 is selected if the monitoring mode is the "normal" mode, whereas a following process step 2206 is selected if the monitoring mode is a "following mode". At present, since the monitoring mode is the "normal" mode, the normal mode process step 2205 is selected.

Next, the normal mode process to be executed when the normal mode step 2205 is selected will be described with reference to FIG. 19.

Figure 19:
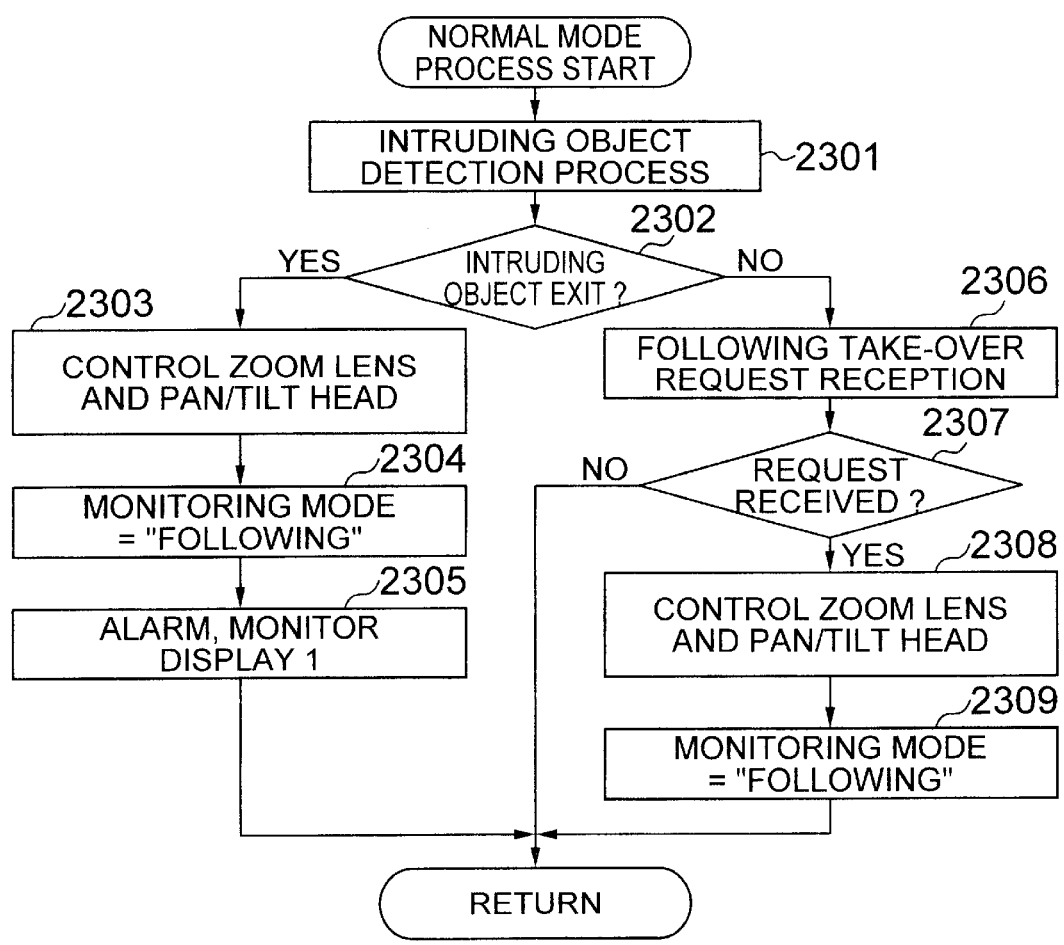
FIG. 19 is a flow chart illustrating the intruding object monitoring method of the embodiment shown in FIG. 18.

In FIG. 19, at an intruding object detecting step 2301, the intruding object detecting process described with FIG. 9 is executed. Therefore, the normal mode means a "detecting mode".

At an intruding object judging step 2302, if the intruding object detecting process detects an intruding object, it is judged that an intruding object exists and a zoom lens and pan/tilt head control step 2303 is selected, whereas if not, it is judged that an intruding object does not exist and a following take-over request reception step 2306 is selected.

If it is judged that an intruding object exists, at the a zoom lens and pan/tilt head control step 2303, the zoom lens 2102 and pan/tilt head 2103 are controlled via the communication I/F 2105, zoom controller 2116 and pan/tilt controller 2115, in accordance with the detection result at the intruding object detecting step 2301, for example, by using the above-described zoom lens and pan/tilt head control sequence. In this manner, the intruding object is displayed on the display by magnifying it sufficiently for reliably recognizing the intruding object.

At a monitoring mode setting step 2304, the present monitoring mode is changed from the "normal" mode to the "following" mode.

At an alarm and monitor display 1 step 2305, the alarm lamp 2113 is turned on to notify a detection of an intruding object, for example, by displaying a message such as "an intruding object is found in the normal mode, transferring to the following mode" by utilizing techniques well-known in the art (description of means for generating and displaying a message is omitted), and an image of the intruding object is displayed on the screen of the monitor 2114.

If it is judged that an intruding object does not exist, at the following take-over request reception step 2306, a following take-over request is received from one or more other intruding object monitoring apparatus connected to the external communication cable 2117.

At a request reception judging step 2307, if it is judged that the following take-over request is received, a zoom lens and pan/tilt control step 2308 is selected, whereas if it is judged that the following take-over request is not received, the normal mode is terminated to thereafter return to the monitoring mode branch step 2203 (FIG. 18).

If it is judged that the following take-over request is received, at the zoom lens and pan/tilt control step 2308, the zoom lens 2102 and pan/tilt head 2103 are controlled in accordance with the size and position of the intruding object at the time when the following take-over request was received, for example, by using the above-described zoom lens and pan/tilt head control sequence.

At a monitoring mode setting step 2309, the present monitoring mode is set to the "following" mode.

The operation of the following mode step 2206 (FIG. 18) will be described with reference to FIG. 20.

Figure 20:
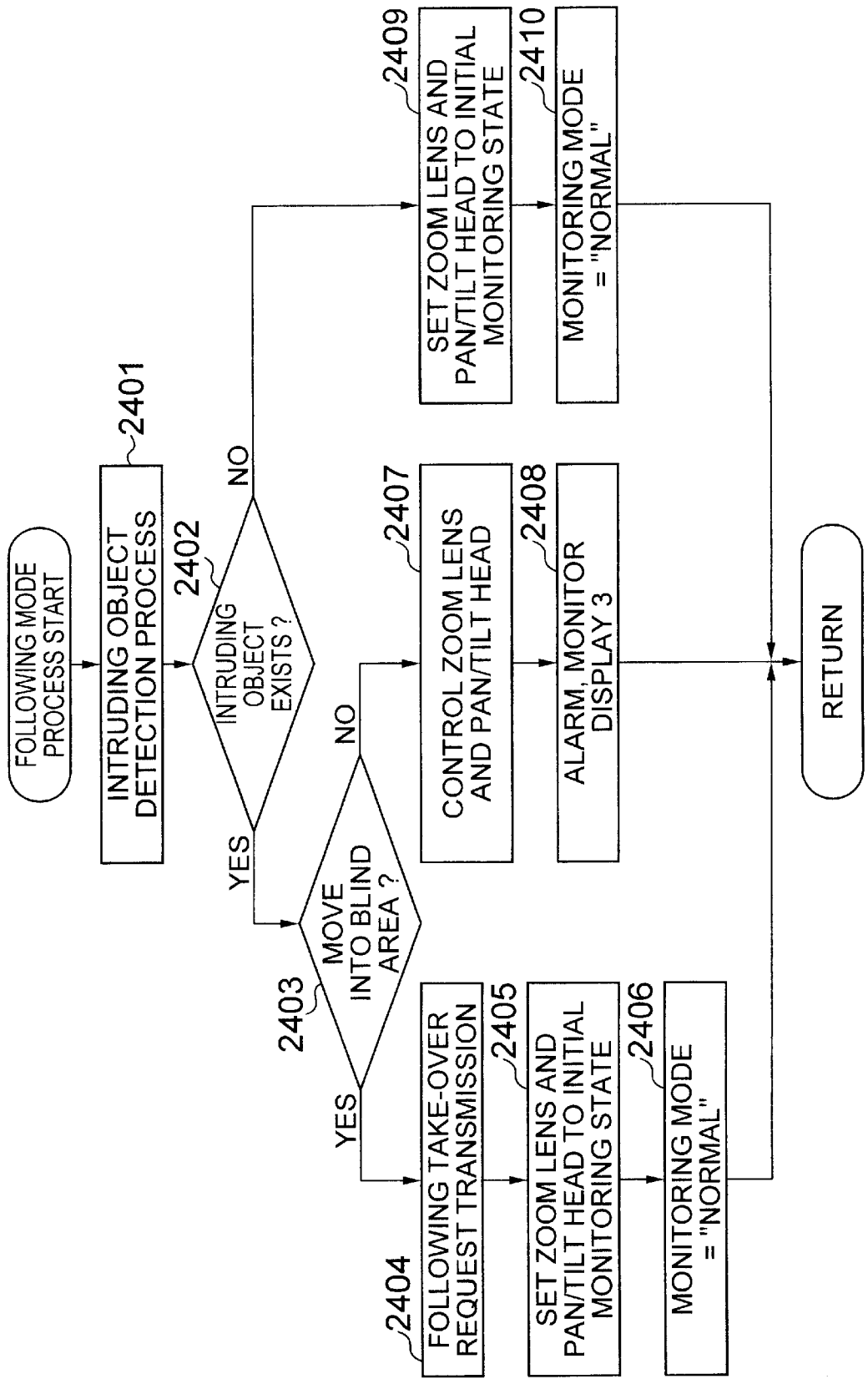
FIG. 20 is a flow chart illustrating the intruding object monitoring method of the embodiment shown in FIG. 18.

FIG. 20 is a flow chart illustrating the operation of the following mode. At an intruding object detecting step 2401, the same process as the intruding object detecting step 2301 shown in FIG. 19 (start of the normal mode) is executed.

At an intruding object judging step 2402, a blind area move judging step 2403 is selected if it is judged that an intruding object exists, whereas if not, an initial monitoring state step 2409 is selected.

At the blind area move judging step 2403, if it is judged that the position of the detected intruding object is changed near to the preset blind area of the camera, a following request transmission step 2404 is selected, whereas if not, a zoom lens and pan/tilt head control step 2407 is selected.

At the following take-over request transmission step 2404, a following take-over request and position data of the intruding object are transmitted to one or more other intruding object monitoring apparatuses connected to the external communication cable 2117 to thereafter advance to an initial monitoring state step 2405.

At the initial monitoring state step 2405, the same process as the initial monitoring state step 2202 (FIG. 18) is executed to reset the zoom lens 2102 and pan/tilt head 2103 to the initial positions.

At a monitoring mode setting step 2406, the present monitoring mode is set to the "normal" mode.

Next, at a zoom lens and pan/tilt head control step 2407, in accordance with the detection result at the intruding object detecting step 2401 (because the intruding object does not move to the blind area), the zoom lens 2102 and pan/tilt head 2103 are controlled via the communication I/F 2105, zoom controller 2116 and pan/tilt head controller 2115, for example, by using the zoom lens and pan/tilt head control sequence.

At an alarm and monitor display 3 step 2408, the alarm lamp 2113 is turned on via the output I/F 2110, and for example an image of the intruding object and a message such as "intruding object is under following" is displayed on the monitor 2114 via the image output I/F 2111.

At an intruding object judging step 2402, if it is judged that an intruding object does not exist, the flow branches to an initial monitoring state step 2409.

At the initial monitoring step 2409, the same process as the initial monitoring state step 2202 (FIG. 18) is executed to reset the zoom lens 2102 and pan/tilt head 2103 to initial positions.

At a monitoring mode setting step 2410, the present monitoring mode is set to the "normal" mode.

Transition between the monitoring modes described with FIGS. 18, 19 and 20 will further be explained with reference to FIG. 26.

Figure 26:
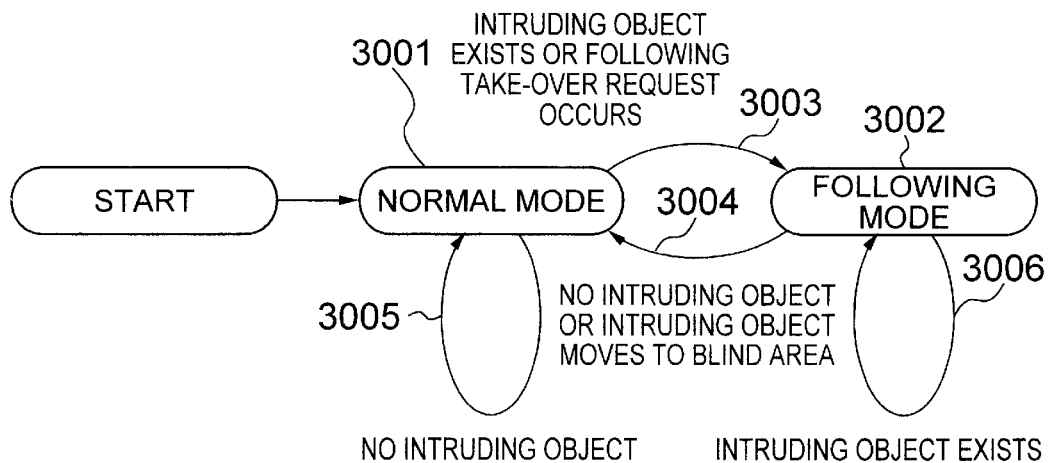
FIG. 26 is a monitoring mode transition diagram illustrating the intruding object monitoring method of the embodiments shown in FIGS. 18, 19 and 20.

FIG. 26 is a diagram showing a transition between a "normal" mode 3001 and a "following" mode 3002. In the "normal" mode 3001, if an intruding object is detected or if a following take-over request occurs, the monitoring mode transits to the "following" mode 3002 (transition 3003). If an intruding object is not detected, the "normal" mode 3001 continues (transition 3005).

In the "following" mode 3002, if an intruding object is not detected or if the intruding objects moves to the blind area, the monitoring mode transits to the "normal" mode 3001 (transition 3004). If an intruding object is detected and it does not move to the blind area, the "following" mode 3002 continues (transition 3006).

This process flow will be described with reference to FIG. 29.

Figure 29:
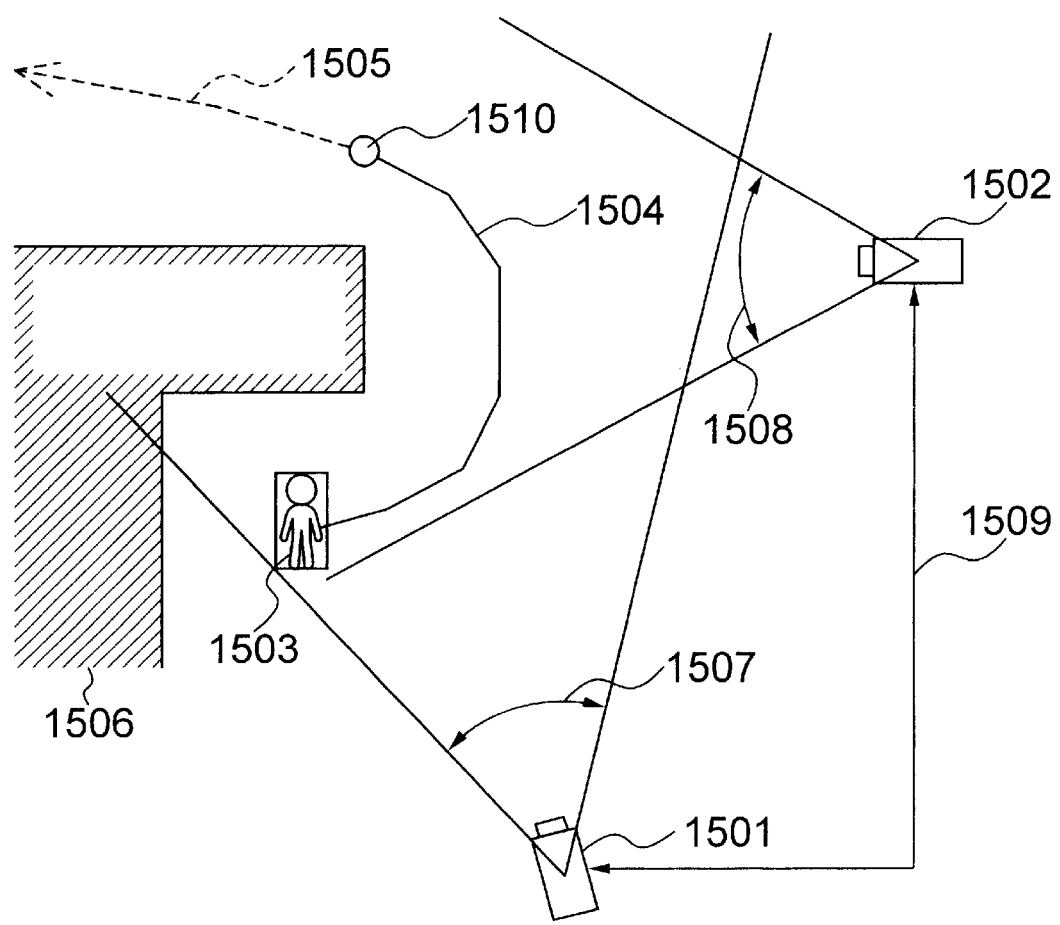
FIG. 29 is a diagram illustrating the operation of two intruding object monitoring apparatus for monitoring a motion path of an intruding object.

FIG. 29 shows an example of monitoring an intruding object 1503 in the monitor area with two intruding object monitoring apparatus 1501 and 1502. The two intruding object monitoring apparatuses 1501 and 1502 can perform data communications therebetween via an external communication cable 1509. It is assumed that the intruding object 1503 moves along motion paths 1504 and 1505.

There is a building 1506 in monitor areas 1507 and 1508 of the two intruding object monitoring apparatuses 1501 and 1502. The monitor areas 1507 and 1508 are largest monitor areas (realized by controlling the pan/tilt heads) capable of being monitored with the two intruding object monitoring apparatuses 1501 and 1502.

At the start of monitoring, both the two intruding object monitoring apparatuses 1501 and 1502 are in the "normal" mode. When the intruding object 1503 is detected, the monitoring mode of the intruding object monitoring apparatus 1501 transits to the "following" mode. While the intruding object 1503 is moving along the motion path 1504, the intruding object monitoring apparatus 1501 performs the following of the intruding object 1503 by controlling the zoom lens and pan/tilt head.

As the intruding object 1503 moves to the position 1510 on the motion path, the intruding object monitoring apparatus 1501 cannot continue the following because of the building 1506. Therefore, the intruding object monitoring apparatus 1501 transmits a following take-over request to the intruding object monitoring apparatus 1502 via the external communication cable 1509.

In response to the following take-over request from the intruding object monitoring apparatus 1501, the intruding object monitoring apparatus 1502 performs the following of the intruding object 1503 in place of the intruding object monitoring apparatus 1501.

Therefore, even if the intruding object 1503 moves to the motion path 1505 (indicated by a dotted line) which is the blind area of the intruding object monitoring apparatus 1501, it is possible to continuously perform the following of the intruding object 1503.

An intruding object monitoring method according to a further embodiment of the invention will be described with reference to the flow charts shown in FIGS. 21, 22, 23 and 24.

In this embodiment, while a first intruding object monitoring apparatus in charge of a first monitor area detects an intruding object and performs the following thereof, if an area unable to be monitored exists, a second intruding object monitoring apparatus in charge of a second monitor area adjacent to the first monitor area monitors the area unable to be monitored by the first intruding object monitoring apparatus.

Figure 21:
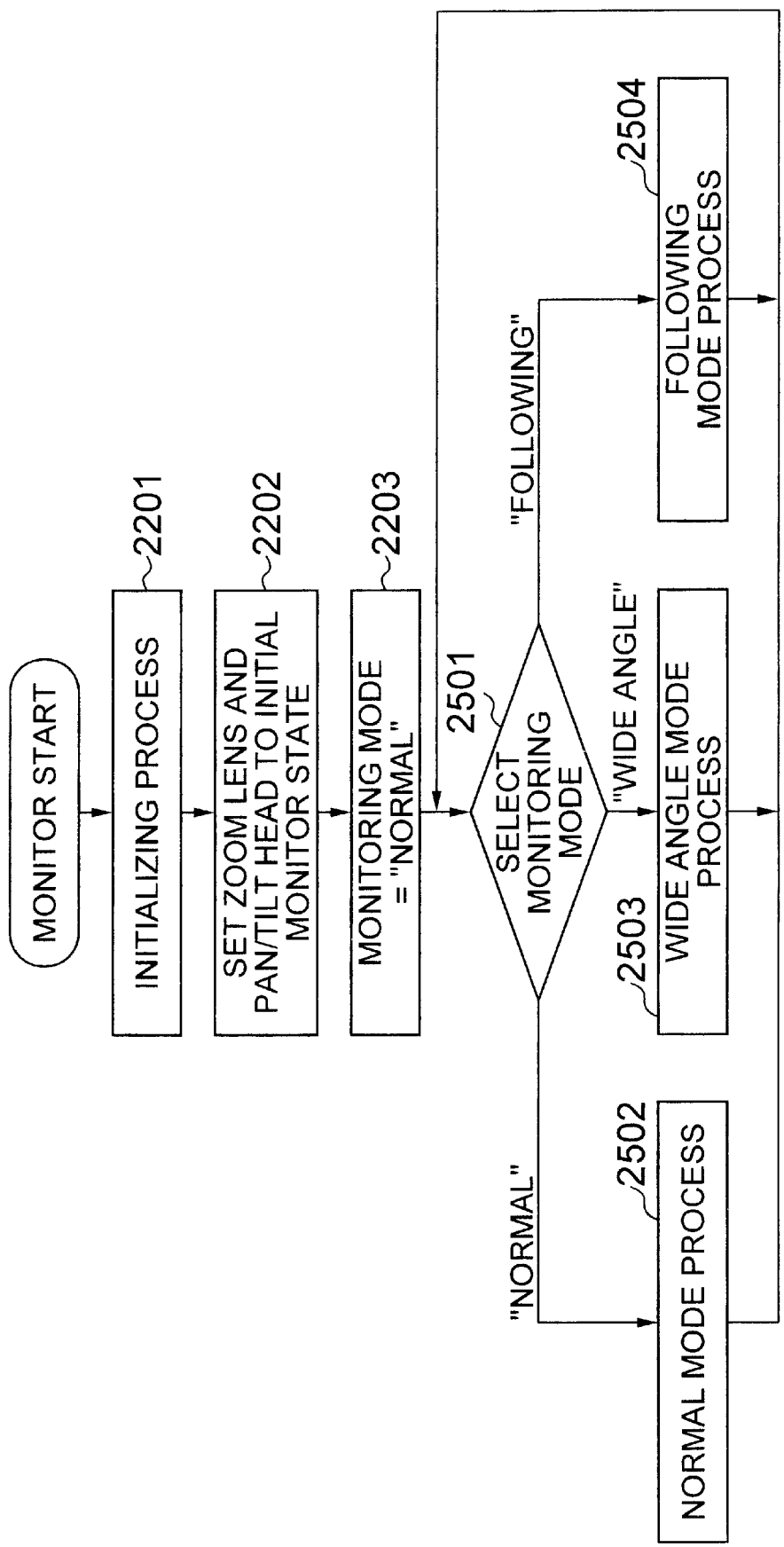
FIG. 21 is a flow chart illustrating an intruding object monitoring method according to another embodiment of the invention.

In the flow chart shown in FIG. 21, a "wide angle" mode is added as the monitoring mode to be selected at the monitoring mode branch step 2204 in the flow chart of the embodiment shown in FIG. 18.

The wide angle mode process step 2503 is added by replacing the monitoring mode branch step 2204 by a monitoring mode branch step 2501, the normal mode process step 2205 by a normal mode process step 2502, and the following mode process step 2206 by a following mode process step 2504.

In the flow chart shown in FIG. 21, at the monitoring mode branch step 2501, in accordance with the present monitoring mode set at the monitoring mode step 2203, the normal mode process step 2502 is selected if the present monitoring mode is the "normal" mode, the wide angle process step 2503 is selected if the present monitoring mode is the "wide angle" mode, and the following mode process step 2504 is selected if the present monitoring mode is the "following" mode.

Figure 22:
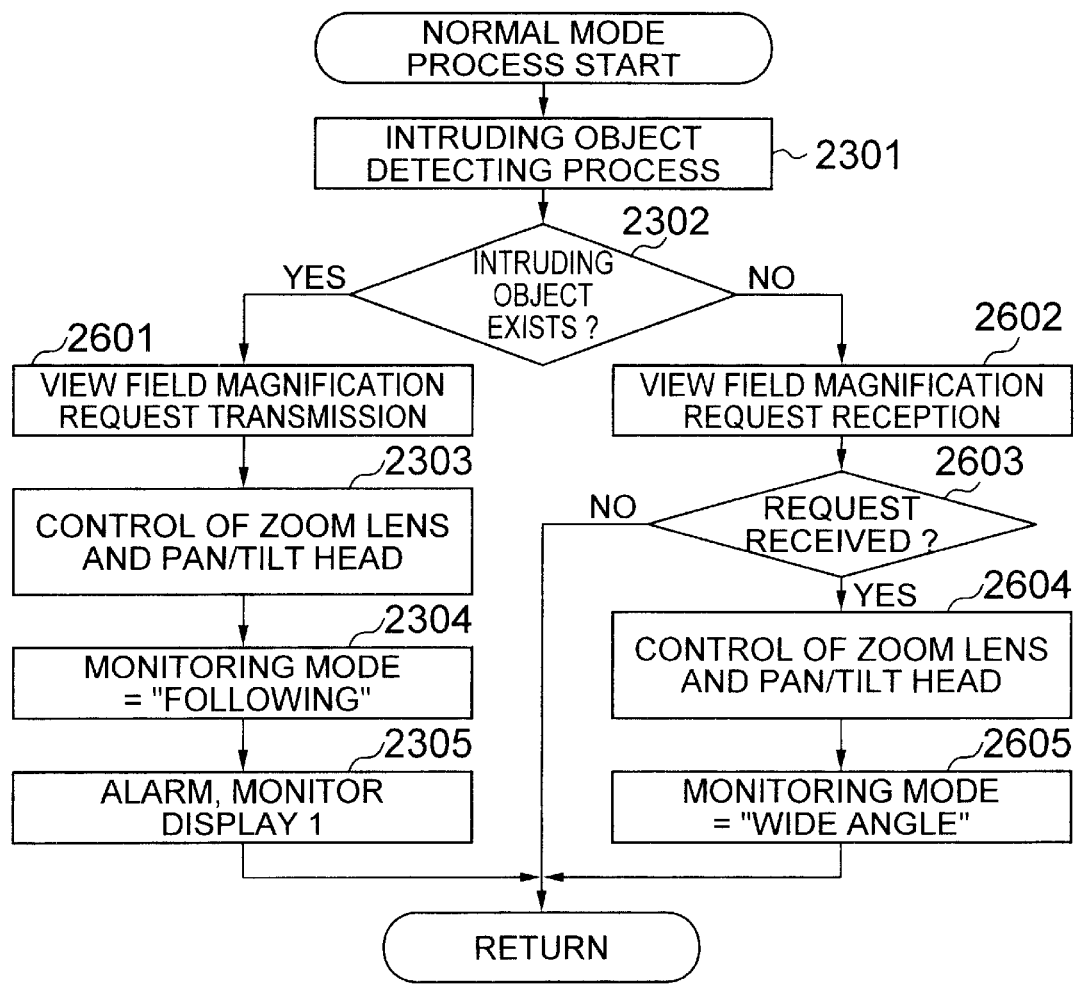
FIG. 22 is a flow chart illustrating the intruding object monitoring method of the embodiment shown in FIG. 21.

Of these mode processes, if the normal mode process step 2502 is selected, the normal mode process shown in the flow chart of FIG. 22 starts.

In the flow chart of FIG. 22 illustrating the normal mode process step 2502, a view field magnification request transmission step 2601 is added before the control step 2303 for the zoom lens and pan/tilt head in the normal mode process shown in the flow chart of FIG. 19, and the following take-over request reception step 2306 to monitoring mode setting step 2309 in the flow chart shown in FIG. 19 are replaced by a view field magnification request reception step 2602 to monitoring mode setting step 2605.

Specifically, if the intruding object detecting step 2301 and intruding object judging step 2302 judge that an intruding object exists, a view field magnification request is transmitted to one or more other intruding object monitoring apparatuses connected to the external communication cable 2117 at the view field magnification request transmission step 2601.

If the intruding object detecting step 2301 and intruding object judging step 2302 judge that an intruding object does not exist, a view field magnification request reception process for receiving a request from one or more other intruding object monitoring apparatuses connected to the external communication cable 2117 is executed at the view field magnification request reception step 2602.

If a view field magnification request reception judging step 2603 judges that a view field magnification request is received, a control step 2604 for the zoom lens and pan/tilt head is selected, whereas if it is judged that a view field magnification request is not received, the normal mode process is terminated to return to the monitoring mode branch step 2501.

If it is judged that a view field magnification request is received, the control step 2604 for the zoom lens and pan/tilt head controls the zoom lens 2102 and pan/tilt head 2103 to set the camera view angle to a wide angle, in accordance with the monitoring view field information of the other intruding object monitoring apparatus which transmitted the view field magnification request. At the monitoring mode setting step 2605, the present monitoring mode is set to the "wide angle" mode.

A method of controlling the zoom lens 2102 and pan/tilt head 2103 after the present monitoring mode is set to the "wide angle" mode will be described with reference to FIGS. 30 and 31.

FIG. 30 shows an example of monitoring an intruding object with first and second intruding object monitoring apparatuses 1601 and 1602. The first intruding object monitoring apparatus 1601 monitors a monitor area 1603, and the second intruding object monitoring apparatus 1602 monitors a monitor area 1604.

Figure 31:
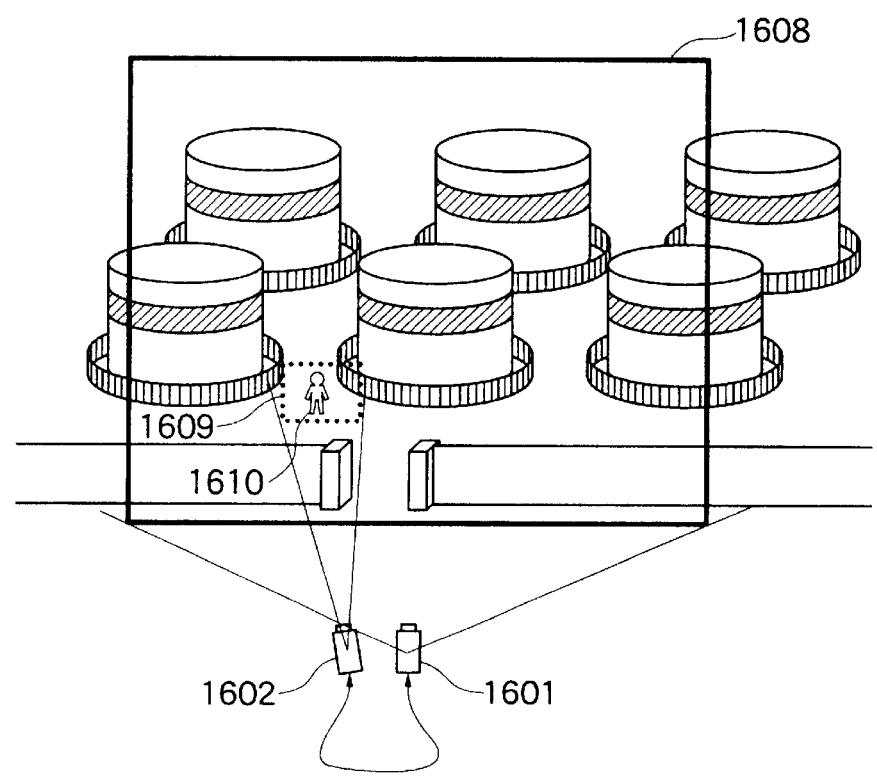
FIG. 31 is a diagram illustrating monitor area allocation to two intruding object monitoring apparatus.

FIG. 31 shows the state that an intruding object is detected during monitoring shown in FIG. 30.

Referring to FIG. 31, as the second intruding object monitoring apparatus 1602 detects an intruding object 1610, it transmits a view field magnification request to the first intruding object monitoring apparatus 1601 in charge of the adjacent monitor area (step 2601 in FIG. 22), controls its zoom lens 2102 and pan/tilt head 2103 (step 2303 in FIG. 22), and sets the present monitoring mode to the "following" mode (step 2304 in FIG. 22).

Upon reception of the view field magnification request from the second intruding object monitoring apparatus 1602 (step 2602 in FIG. 22), the first intruding object monitoring apparatus 1601 controls its zoom lens 2102 and pan/tilt head 2103 (step 2604 in FIG. 22) in order to monitor a new monitor area 1608 including the monitor areas 1603 and 1604 of the first and second intruding object monitoring apparatus 1601 and 1602, and sets the present monitoring mode to the "wide angle" mode (step 2605 in FIG. 22).

Figure 23:
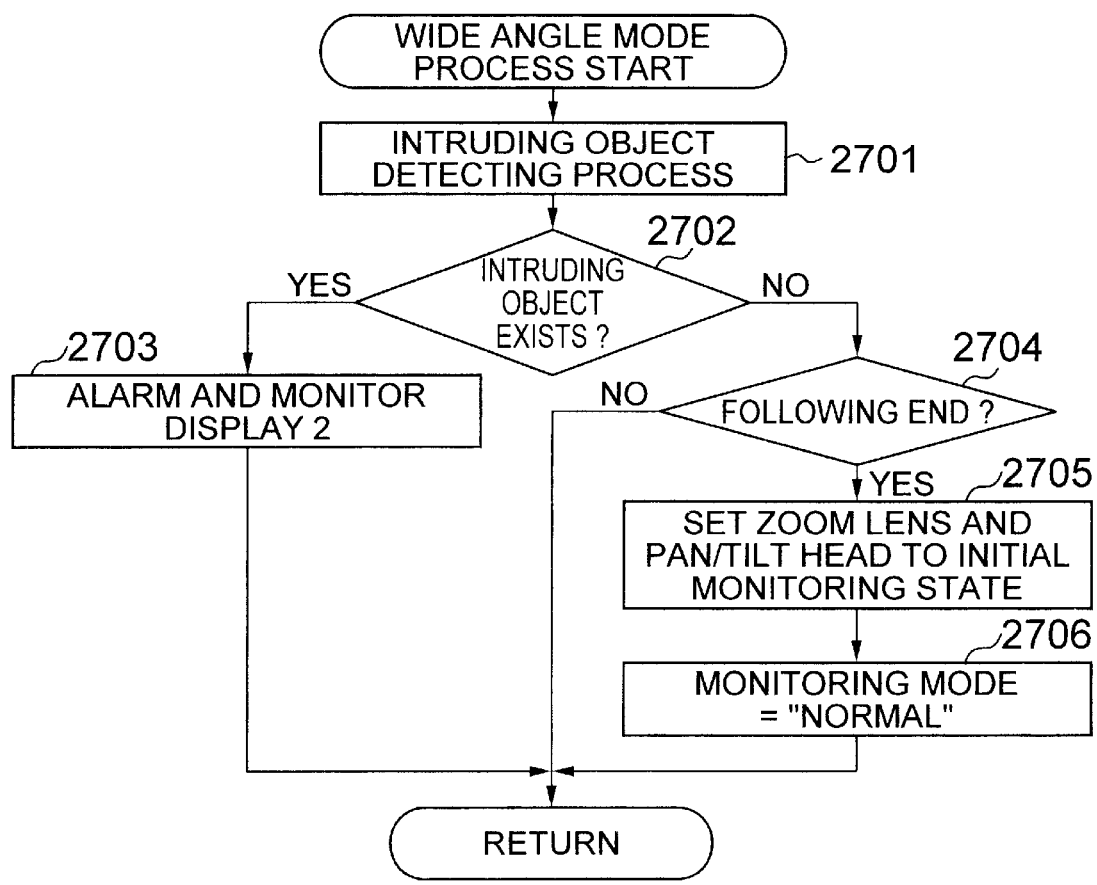
FIG. 23 is a flow chart illustrating the intruding object monitoring method of the embodiment shown in FIG. 21.

After the present monitoring mode is set to the "wide angle" mode, the wide angle mode process step 2503 shown in FIG. 21 is executed to start the wide angle mode process shown in FIG. 23.

Referring to FIG. 23, at an intruding object detecting step 2701, the same intruding object detecting process as that of the intruding object detecting step 2301 described with FIG. 19 is executed.

At an intruding object judging step 2702, if an intruding object is detected by the intruding object detecting process and it is judged that the intruding object exists, an alarm and monitor display 2 step 2703 is selected. If an intruding object is not detected by the intruding object detecting process, it is judged that an intruding object does not exist and a following end judging step 2704 is selected.

At the alarm and monitor display 2 step 2703, the alarm lamp 2113 is turned on to notify a detection of an intruding object and an image of the intruding object 1610 together with a message such as "intruding object is detected in wide angle mode" is displayed on the monitor 2114.

At the following end judging step 2704, if all the intruding object monitoring apparatus connected to the external communication cable 2117 are not in the following mode, an initial monitoring state step 2705 is selected. At this initial monitoring state step 2705 performing the same process as that at the initial monitoring state step 2202 shown in FIG. 18, the zoom lens 2102 and pan/tilt head 2103 are reset to initial positions.

At a monitoring mode setting step 2706, the present monitoring mode is set to the "normal" mode.

At the following end judging step 2704, if at least one of the intruding object monitoring apparatuses connected via the external communication cable 2117 is in the following mode, the wide angle mode is terminated to return to the monitoring mode branch step 2501 shown in FIG. 21.

Figure 24:
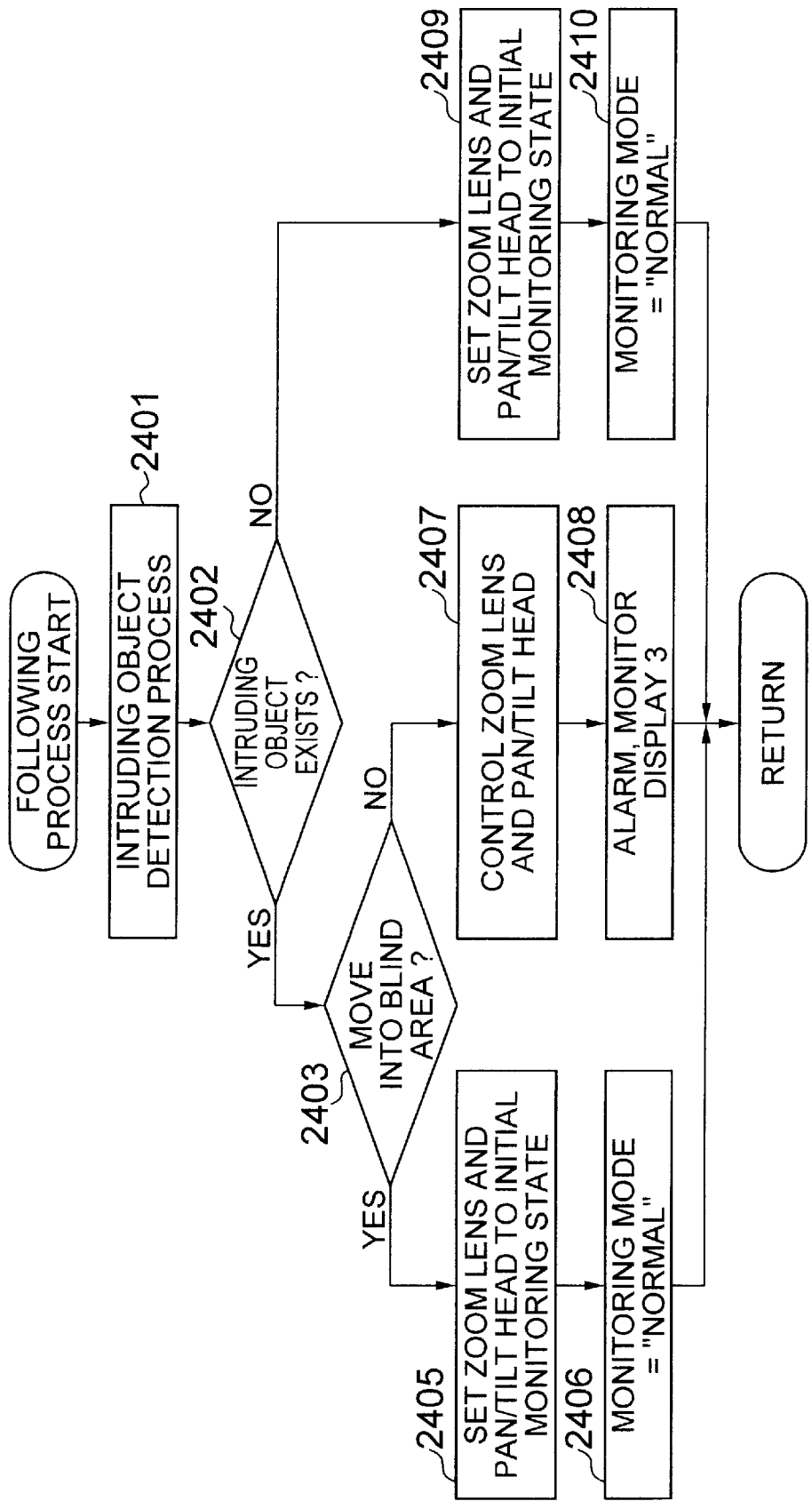
FIG. 24 is a flow chart illustrating the intruding object monitoring method of the embodiment shown in FIG. 21.

At the following mode process step 2504 shown in FIG. 21, a following mode process shown in FIG. 24 is performed. The flow chart shown in FIG. 24 corresponds to the flow chart of the following mode process shown in FIG. 20, with the following take-over request transmission step 2404 being removed. The reason for this removal is as follows. In the embodiments shown in FIGS. 18, 19, 20 and 29, if an intruding object under the following moves to a blind area of the camera, another camera takes over the following. For this reason, the following take-over request transmission step 2404 was necessary. In this embodiment, however, after an intruding object is detected and the following starts by using a first camera, the zoom lens of a second camera is set to a wide angle to cover the monitor area of the first camera so that the following take-over is not necessary. Therefore, in the process shown in FIG. 24, if the intruding object detecting step 2401 does not detect an intruding object or if a detected intruding object moves to the blind area (YES at the blind area move judging step 2403), then it is assumed that the intruding object moved to an area outside of the monitor area, and the zoom lens and pan/tilt head are reset to initial positions (steps 2405 and 2409) and the monitoring mode is set to the "normal" mode (steps 2506 and 2410).

Transition between the "normal" "wide angle" and "following" modes described with FIGS. 21, 22, 23 and 24 will be further explained with reference to FIG. 27.

Figure 27:
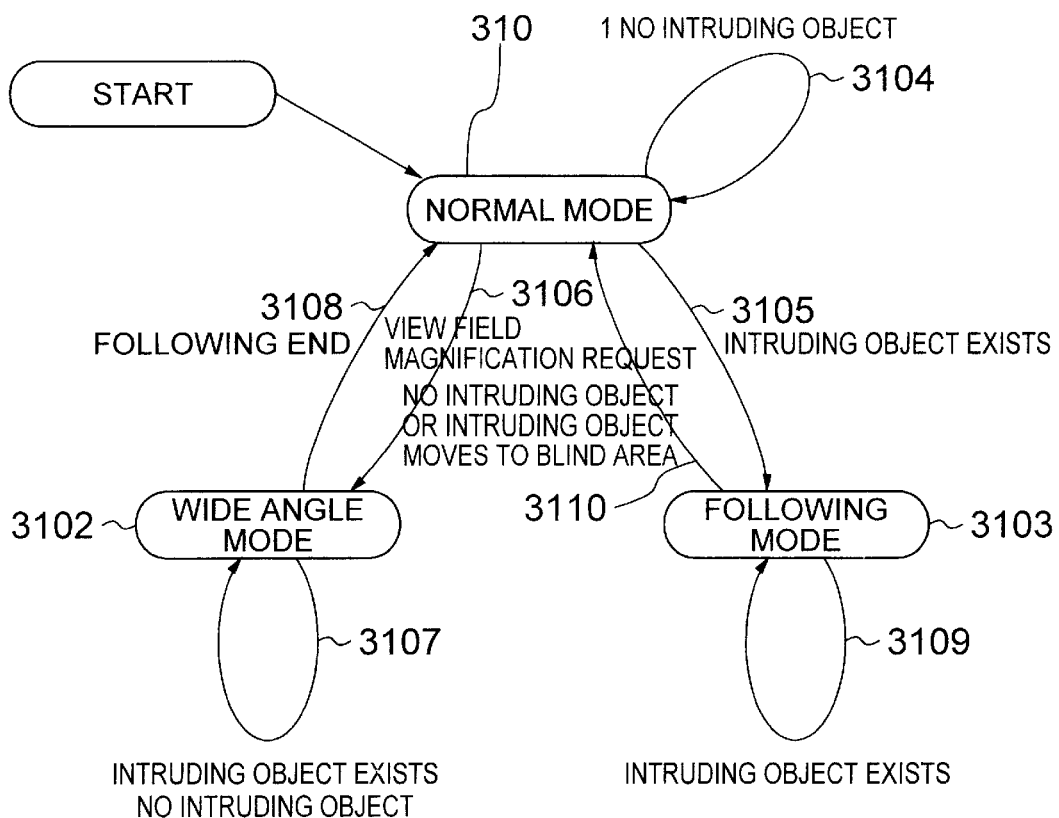
FIG. 27 is a monitoring mode transition diagram illustrating the intruding object monitoring method of the embodiments shown in FIGS. 21, 22, 23 and 24.

FIG. 27 is a diagram showing transition between the "normal" mode 3101, "wide angle" mode 3102 and "following" mode 3103. In the "normal" mode 3101, if the view field magnification request is received, the monitoring mode transits to the "wide angle" mode 3102 (transition 3106), if an intruding object is detected, the monitoring mode transits to the "following" mode 3103 (transition 3105), and if an intruding object is not detected, the "normal" mode 3101 continues (transition 3104).

In the "wide angle" mode 3102, if the following ends, the monitoring mode transits to the "normal" mode 3101 (transition 3108), and in other cases, the "wide angle" mode continues (transition 3107).

In the "following" mode 3103, if an intruding object is not detected or an intruding object moves to a blind area, the monitoring mode transits to the "normal" mode 3101 (transition 3110), or if an intruding object is detected and an intruding objects does not move to the blind area, the "following" mode 3103 continues (transition 3109).

According to the intruding object monitoring method of the embodiment shown in FIGS. 30 and 31, as the second intruding object monitoring apparatus 1602 transits to the following mode, only a partial area of the monitor area 1604 can be monitored and the second intruding object monitoring apparatus 1602 has a blind area. However, in this case, the monitor area 1603 of the first intruding object monitoring apparatus 1601 is expanded to the wide angle so that the blind area of the second intruding object monitoring apparatus 1602 can be covered.

In the embodiment shown in FIGS. 30 and 31, although the two intruding object monitoring apparatuses are disposed right and left, they may be disposed up and down or upper right and left. In this case, it is obvious that similar effects can be obtained.

The operation of an intruding object monitoring method according to a further embodiment of the invention will be described with reference to the flow chart shown in FIG. 25.

In this embodiment, if an intruding object under the following enters a blind area, another second intruding object monitoring apparatus for monitoring the monitor area including the blind area takes over the following, or while a first intruding object monitoring apparatus in charge of a first monitor area detects an intruding object and is performing the following, if an area unable to be monitored is formed, another second intruding object monitoring apparatus in charge of a second monitor area adjacent to the first monitor area monitors the monitor area covering the area unable to be monitored.

Figure 25:
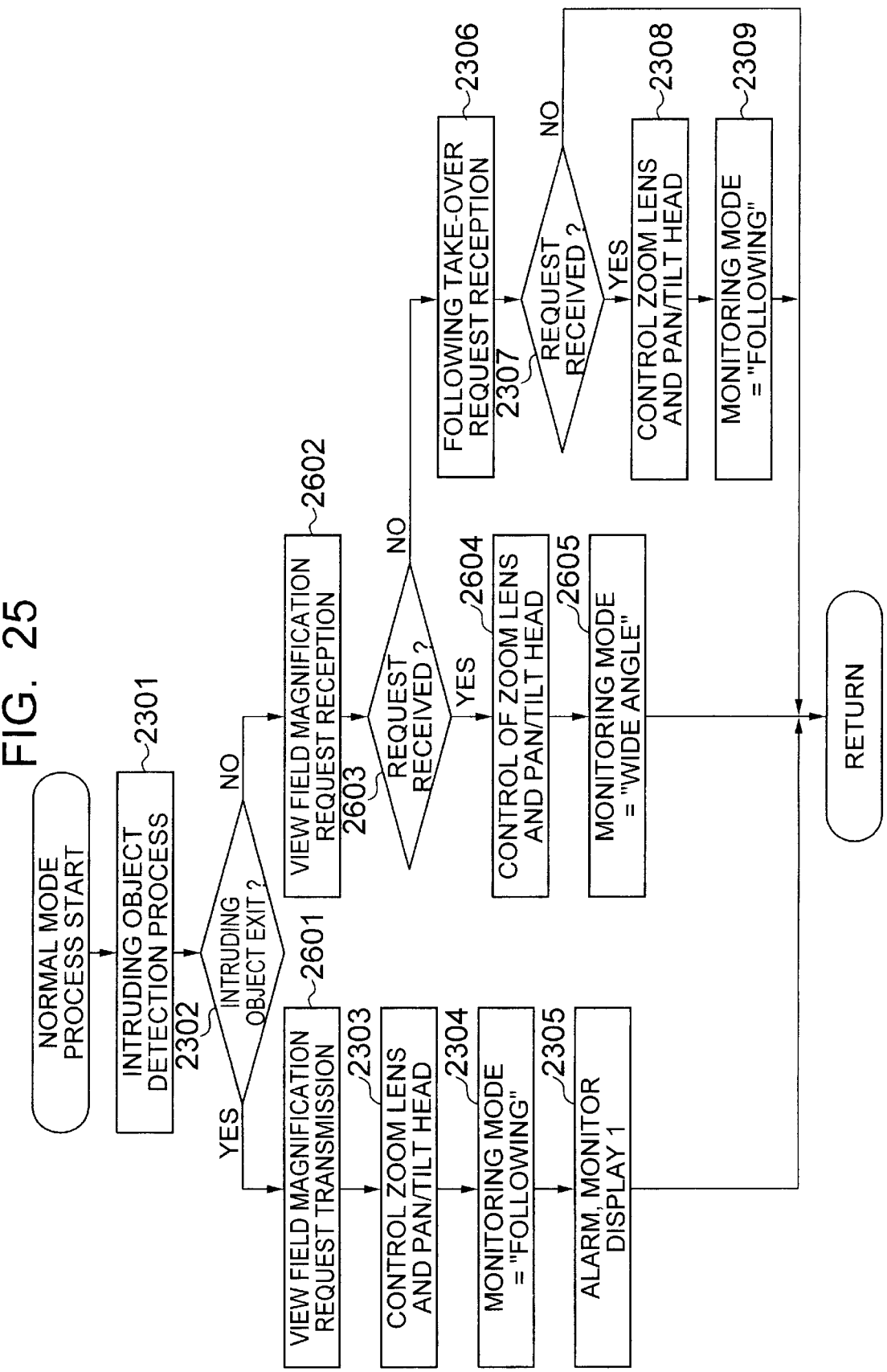
FIG. 25 is a flow chart illustrating an intruding object monitoring method according to another embodiment of the invention.

The flow chart shown in FIG. 25 adds the following take-over request reception step 2306 to monitoring mode setting step 2309 shown in the flow chart of the normal mode process shown in FIG. 19 to the flow chart of the normal mode process shown in FIG. 22, to be used if the request is not received at the view field magnification request judging step 2603.

The operation at each step has been described already, and so it is omitted.

Figure 28:
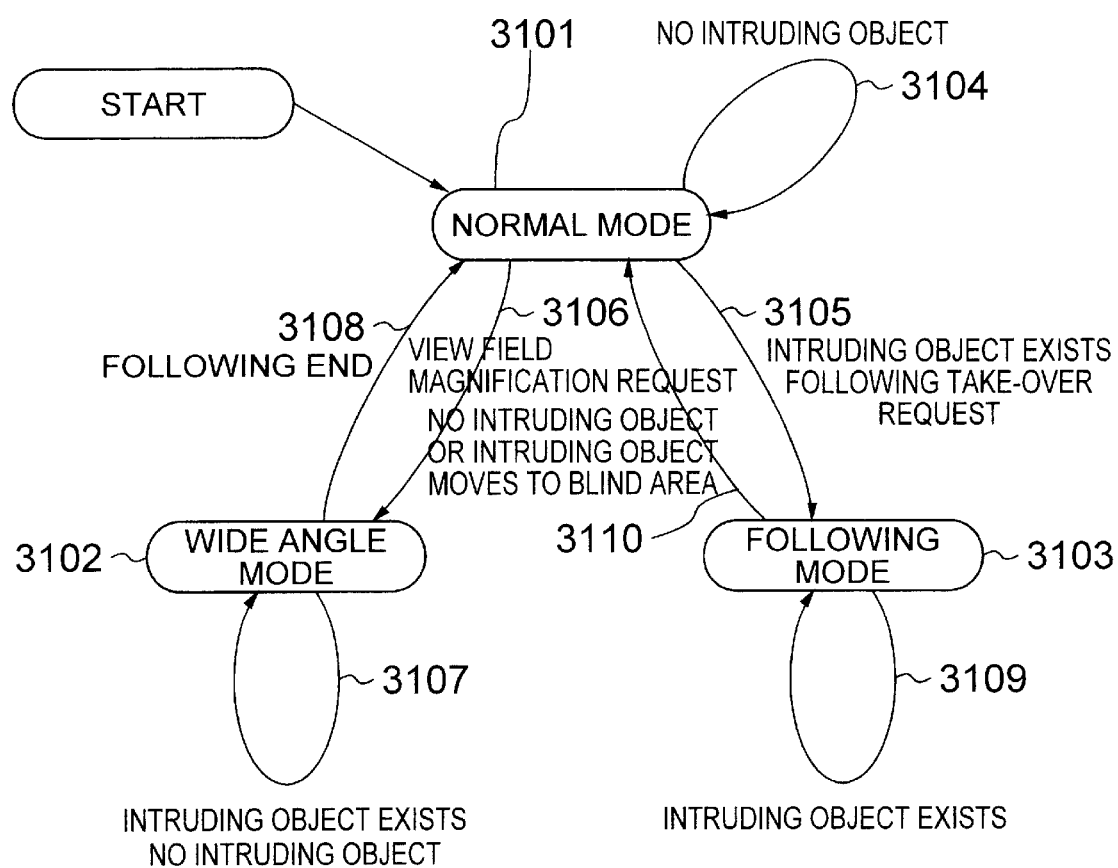
FIG. 28 is a monitoring mode transition diagram illustrating the intruding object monitoring method of the embodiment shown in FIG. 25.

FIG. 28 is a diagram showing transition between the "normal" mode 3101, "wide angle" mode 3102 and "following" mode 3103. In FIG. 28, a transition 3201 is added to be replaced by the transition 3105 between the "normal" mode 3101 and "following" mode 3103 shown in FIG. 27.

In this transition 3210, the monitoring mode transits from the "normal" mode 3101 to the "following" mode 3103 if an intruding object is detected or a following take-over request is received.

Therefore, as shown in FIG. 29, even if the intruding object 1503 moves along the motion path 1505 into the blind area of the intruding object monitoring apparatus 1501, it is possible to continuously perform the following of the intruding object 1503.

Further, as shown in FIGS. 30 and 31, when the second intruding object monitoring apparatus 1602 transits to the following mode, only a partial area of the monitor area 1604 can be monitored and the second intruding object monitoring apparatus 1602 has a blind area. However, in this case, the monitor area 1603 of the first intruding object monitoring apparatus 1601 is expanded to the wide angle monitor area 1608 so that the dead space can be covered.

According to the embodiment, since two or more intruding object monitoring apparatuses monitor the monitor area in a shared manner, the following of an intruding object in a blind area of one intruding object monitoring apparatus can be taken over by another intruding object monitoring apparatus. An intruding object monitoring method and an intruding object monitoring system having a high reliability can therefore be provided.

What is claimed is:

1. An intruding object monitoring method for use in an intruding object monitoring system having a first intruding object monitoring apparatus having a first camera for inputting images of a monitor area and at least one second intruding object monitoring apparatus having a second camera for performing a following of an intruding object, the method comprising the steps of:

acquiring first information of an object intruding into said monitor area with said first camera of said first intruding object monitoring apparatus, said first information including position information of said intruding object;

transmitting said first information from said first intruding object monitoring apparatus to a second intruding object monitoring apparatus;

capturing said intruding object with said second camera of said second intruding object monitoring apparatus in accordance with said position information from said first intruding object monitoring apparatus;

acquiring second information of said captured intruding object picked up by said second camera of said second intruding object monitoring apparatus; and following said captured intruding object with said second camera of said second intruding object monitoring apparatus by controlling at least said second camera of said second intruding object monitoring apparatus based on said second information of said captured intruding object obtained from said second camera of said second intruding object monitoring apparatus.

2. An intruding object monitoring method according to claim 1, wherein said first intruding object monitoring apparatus performs a tracking of said intruding object and when the following of the intruding object by the first intruding object monitoring apparatus becomes impossible, the first intruding object monitoring apparatus continues the following by acquiring said second information of the intruding object from the second intruding object monitoring apparatus.

3. An intruding object monitoring method according to claim 1, wherein when the following of the intruding object by the second intruding object monitoring apparatus becomes impossible, the second intruding object monitoring apparatus continues the following by acquiring said first information of the intruding object from the first intruding object monitoring apparatus.

4. An intruding object monitoring method according to claim 1, wherein the intruding object monitoring system has a plurality of second intruding object monitoring apparatuses; and said first intruding object monitoring apparatus, when detected a new intruding object, causes one of the second intruding object monitoring apparatuses not in intruding object following to follow said new intruding object.

5. An intruding object monitoring method according to claim 1, wherein said following request is sent via a communication line interconnecting said first and second intruding object monitoring apparatuses.

6. An intruding object monitoring method for use in an intruding object monitoring system having a first intruding object monitoring apparatus having a first camera, a view field of which is a monitor area and at least one second intruding object monitoring apparatus having a second camera a monitor area of which is a partial area of the view field of the first intruding object monitoring apparatus, comprising the steps of:

picking up images of the monitor area by said first camera of the first intruding object monitoring apparatus;

acquiring first information of an intruding object from the images outputted by said first camera of said first intruding object monitoring apparatus, said first information including position information of said object;

capturing the intruding object by controlling said second camera of the second intruding object monitoring apparatus according to said position information;

acquiring second information of the intruding object in the monitor area, picked up by said second camera of the second intruding object monitoring apparatus; and performing a following of the intruding object by controlling said second camera of the second intruding object monitoring apparatus in accordance with said second information of said captured intruding object obtained from said second camera of said second intruding object monitoring apparatus.

7. An intruding object monitoring method according to claim 6, wherein said second information is information including a size and position of the intruding object, and the following of the intruding object captured by the second intruding object monitoring apparatus is performed by changing a direction and zoom of the second intruding object monitoring apparatus by controlling the pan/tilt head and a zoom lens of the second intruding object monitoring apparatus in accordance with said second information.

8. An intruding object monitoring method according to claim 6, wherein said first information of the intruding object is detected by a subtraction method.

9. An intruding object monitoring method according to claim 6, wherein the second information of the intruding object is detected by a template matching method.

10. An intruding object monitoring method according to claim 6, wherein the intruding object monitoring system has a plurality of second intruding object monitoring apparatuses, and wherein said intruding object monitoring method further comprises:
- judging whether the intruding object is a newly detected intruding object,
- if a new intruding object is detected, supplying, by the first intruding object monitoring apparatus, third information of the newly detected intruding object to one of the second intruding object monitoring apparatuses not performing the intruding object following;
- capturing, by the second intruding object monitoring apparatus the newly detected intruding object in accordance with the supplied third information; and
- after the newly detected intruding object is captured, performing, by the second intruding object monitoring apparatus, the following of the captured intruding object based on information other than said third information from the first intruding object monitoring apparatus.

11. An intruding object monitoring method according to claim 6, wherein the intruding object monitoring system has a plurality of second intruding object monitoring apparatuses; and
- the method further comprises a step of judging whether the intruding object is a newly detected intruding object, and
- an assigning step of identifying one of the second intruding object monitoring apparatuses now not in intruding object following if the intruding object is judged as a newly detected intruding object, supplying forth information of the intruding object to the identified second intruding object monitoring apparatus, and assigning the following to the identified second intruding object monitoring apparatus.

12. An intruding object monitoring method according to claim 11, wherein said assigning step assigns the following to the second intruding object monitoring apparatus nearest to the newly detected intruding object among the second intruding object monitoring apparatuses now not in following.

13. An intruding object monitoring method according to claim 11, wherein at least two areas having different priority orders are set beforehand in the view field covering the monitor area, and when two or more new intruding objects are detected, the following is assigned to a second intruding object monitoring apparatus in order from an intruding object detected in an area having a highest priority order.

14. An intruding object monitoring method for use in an intruding object monitoring system having a first intruding object monitoring apparatus having a view field covering a monitor area and at least one second intruding object monitoring apparatus having as a monitor area a partial area of the view field of the first intruding object monitoring apparatus comprising a step of:
- picking up images of the monitor area by the first intruding object monitoring apparatus;
- acquiring first information of an intruding object from the images outputting by said first intruding object monitoring apparatus;
- capturing the intruding object by controlling the second intruding object monitoring apparatus according to said first information;
- acquiring second information of the intruding object in the monitor area with the second intruding object monitoring apparatus; and
- judging whether the intruding object is a newly detected intruding object based on said second information,
- wherein if the intruding object is a newly detected intruding object, the second intruding object monitoring apparatus performs the following of the newly detected intruding object.

15. An intruding object monitoring method according to claim 14, wherein if said judging step judges that the intruding object is not a newly detected intruding object, the intruding object is the intruding object under tracking by the first intruding object monitoring apparatus, and a change from a past position of the intruding object to a present position of the intruding object is used as a motion locus of the intruding object under the tracking.

16. An intruding object monitoring method according to claim 14, wherein the intruding object monitoring system further comprises a display for displaying an image taken with the first or second intruding object monitoring apparatus, and the motion locus of the intruding object is displayed on the display, being superposed upon the image of the intruding object taken with the second intruding object monitoring apparatus.

17. An intruding object monitoring system comprising:
- a plurality of intruding object monitoring apparatus, each of which has a camera for monitoring a predetermined monitor area; and
- a communication apparatus for transmitting first information relating to an intruding object between said plurality of intruding object monitoring apparatuses,
- wherein a plurality of said intruding object monitoring apparatuses are each switchably operable among a plurality of monitoring modes including at least a detecting mode having an intruding object detecting function for performing a tracking of said intruding object and a following mode for performing a following of said intruding object, and when one of said camera of said intruding object monitoring apparatuses detects said intruding object, said camera outputs second information relating to said detected intruding object, and said camera follows said detected intruding object based on said second information.

18. An intruding object monitoring system according to claim 17, wherein said plurality of intruding object monitoring apparatuses monitor one monitor area in a shared manner.

19. An intruding object monitoring system according to claim 17, wherein each of said intruding object monitoring apparatus changes the monitoring mode from the detecting mode to the following mode when the intruding object monitoring apparatus detects an intruding object in the detecting mode or when a following request is received from another intruding object monitoring apparatus.

20. An intruding object monitoring system according to claim 17, wherein when one intruding object monitoring apparatus becomes impossible to perform the following of an intruding object, another intruding object monitoring apparatus takes over the following of the intruding object.

21. An intruding object monitoring system according to claim 17, wherein each of said intruding object monitoring apparatus further includes a wide angle mode and monitors an area broader than said predetermined monitor area in the wide angle mode.

22. An intruding object monitoring system according to claim 21, wherein when one intruding object monitoring apparatus transits to the following mode, another intruding object monitoring apparatus transits to the wide angle mode in order to cover the monitor area of said one intruding object monitoring apparatus.

23. An intruding object monitoring system comprising:
a first intruding object monitoring apparatus having a first camera for picking up images of a monitor area and acquiring first information including position information of an intruding object in the monitor area;
at least one second intruding object monitoring apparatus having a second camera for capturing the intruding object in accordance with said position information acquired by said first intruding object monitoring apparatus, and outputting second information of said captured intruding object and performing a following of the captured intruding object based on said second information from said second intruding object monitoring apparatus,
wherein said first intruding object monitoring apparatus includes an intruding object monitoring unit, said second intruding object monitoring apparatus includes an intruding object monitoring unit separated from the intruding object monitoring unit of said first intruding object monitoring apparatus, and said second intruding object monitoring apparatus performs the following of the captured intruding object based on said second information from said second intruding object monitoring apparatus.

24. An intruding object monitoring system comprising:
a first intruding object monitoring apparatus for picking up images of a monitor area and acquiring first information of an intruding object in the monitor area; and
at least one second intruding object monitoring apparatus for capturing the intruding object in accordance with said first information acquired by said first intruding object monitoring apparatus, and performing a following of the captured intruding object based on information other tan said first information of said first intruding object monitoring apparatus,
wherein when said second intruding object monitoring apparatus captures the newly detected intruding object, said second intruding object monitoring apparatus performs the following of the newly detected intruding object.

25. An intruding object monitoring apparatus comprising:
a camera having a zoom lens;
an image processing unit for detecting an intruding object from image signals supplied from said camera;
a pan/tilt head of said camera;
a pan/tilt controller;
a zoom controller;
a communication unit for communication with at least another intruding object monitoring apparatus;
a display for displaying an intruding object monitoring result; and
a control unit for controlling to switch among a plurality of monitoring modes of the intruding object monitoring apparatus and said another intruding object monitoring apparatus,
wherein if a view field magnification is requested from an adjacent other intruding object monitoring apparatus, the monitoring mode of the intruding object monitoring apparatus is switched to a wide angle mode and monitors an area which is broader than the monitor area in a normal mode and includes at least a part of the monitor area in the normal mode of the adjacent other intruding object monitoring apparatus.

26. An intruding object monitoring apparatus comprising:
a camera having a zoom lens;
an image processing unit for detecting an intruding object from image signals supplied from said camera;
a pan/tilt head of said camera;
a pan/tilt controller;
a zoom controller;
a communication unit for communication with at least another intruding object monitoring apparatus;
a display for displaying an intruding object monitoring result; and
a control unit for controlling to switch among a plurality of monitoring modes of the intruding object monitoring apparatus and said another intruding object monitoring apparatus,
wherein if the monitoring mode of the intruding object monitoring apparatus is a normal mode for monitoring a predetermined monitor area and if said image processing unit detects an intruding object, a view field magnification request is transmitted to an adjacent other intruding object monitoring apparatus and the monitoring mode of the intruding object monitoring apparatus is switched to a following mode.

27. An intruding object monitoring apparatus comprising:
a camera having a zoom lens;
an image processing unit for detecting an intruding object from image signals supplied from said camera;
a pan/tilt head of said camera;
a pan/tilt controller;
a zoom controller;
a communication unit for communication with at least another intruding object monitoring apparatus;
a display for displaying an intruding object monitoring result; and
a control unit for controlling to switch among a plurality of monitoring modes of the intruding object monitoring apparatus and said another intruding object monitoring apparatus,
wherein when the intruding object under a following by the intruding object monitoring apparatus enters a blind area of said camera, a following take-over request is transmitted to another intruding object monitoring apparatus having the monitor area including said blind area.

* * * * *